United States Patent
Pernu et al.

(10) Patent No.: US 8,854,993 B2
(45) Date of Patent: Oct. 7, 2014

(54) INTEROPERABILITY INTERFACE FOR MODEM CONTROL

(75) Inventors: Ville Pernu, Tampere (FI); Jussi Tuomas Benjamin Ratilainen, Viiala (FI)

(73) Assignee: Nokia Corporation, Espoo (FI)

( * ) Notice: Subject to any disclaimer, the term of this patent is extended or adjusted under 35 U.S.C. 154(b) by 986 days.

(21) Appl. No.: 12/648,489

(22) Filed: Dec. 29, 2009

(65) Prior Publication Data

US 2010/0188998 A1    Jul. 29, 2010

Related U.S. Application Data

(60) Provisional application No. 61/147,012, filed on Jan. 23, 2009.

(51) Int. Cl.
*H04J 3/16* (2006.01)
*H04W 88/06* (2009.01)
*H04L 12/24* (2006.01)

(52) U.S. Cl.
CPC .......... *H04W 88/06* (2013.01); *H04L 41/5003* (2013.01); *H04L 41/0806* (2013.01)
USPC ............ 370/252; 370/255; 370/341; 370/437

(58) Field of Classification Search
CPC ... H04W 80/04; H04W 76/022; H04W 76/02; H04W 36/12; H04W 36/14; H04W 48/08; H04W 76/041; H04W 84/045; H04W 36/0011; H04W 36/0027; H04W 76/021; H04W 88/06; H04W 36/0022; H04W 36/0033
USPC ......... 370/229, 230, 231, 235, 252, 254, 255, 370/341, 401, 431, 437, 465
See application file for complete search history.

(56) References Cited

U.S. PATENT DOCUMENTS

| | | | |
|---|---|---|---|
| 2007/0263709 A1* | 11/2007 | Kasslin et al. | 375/222 |
| 2007/0263710 A1* | 11/2007 | Kasslin et al. | 375/222 |
| 2007/0265034 A1* | 11/2007 | Kasslin et al. | 455/557 |
| 2007/0281743 A1* | 12/2007 | Palin et al. | 455/557 |
| 2008/0043714 A1 | 2/2008 | Pernu | |
| 2008/0240048 A1 | 10/2008 | Okker et al. | |
| 2008/0291830 A1 | 11/2008 | Pernu et al. | |

* cited by examiner

*Primary Examiner* — Yemane Mesfin
*Assistant Examiner* — Mon Cheri Davenport
(74) *Attorney, Agent, or Firm* — Locke Lord LLP

(57) ABSTRACT

A system for facilitating interaction with one or more radio modules incorporated within an apparatus. An interface may be provided to supply parameters usable by one or more radio modules for regulating communication. In at least one example configuration, the interface may receive information pertaining to one or more communication flows, may utilize the communication flow information to determine operational conditions for managing the one or more communication flows, and may formulate parameters for controlling one or more radio modules based on the operational condition information. These formulated parameters may then be provided to the one or more radio modules in the apparatus.

15 Claims, 26 Drawing Sheets

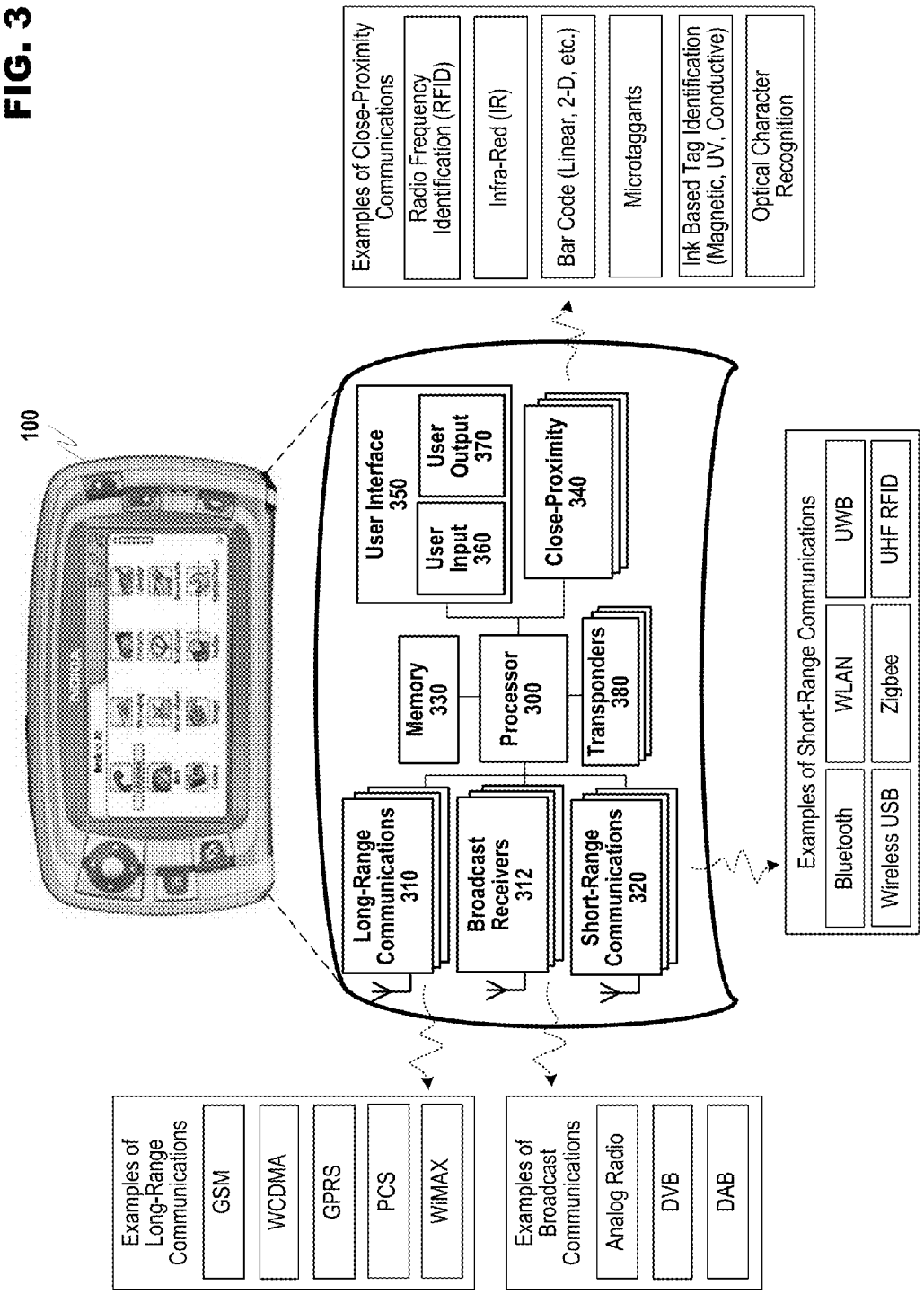

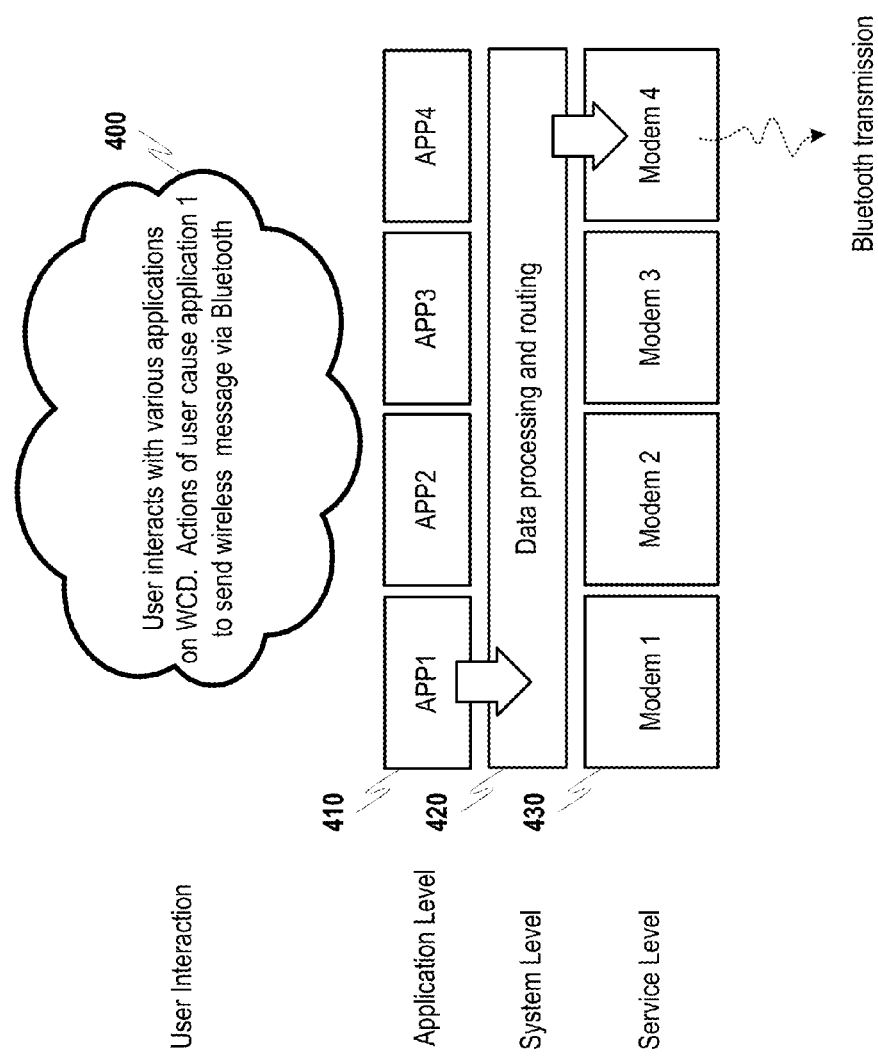

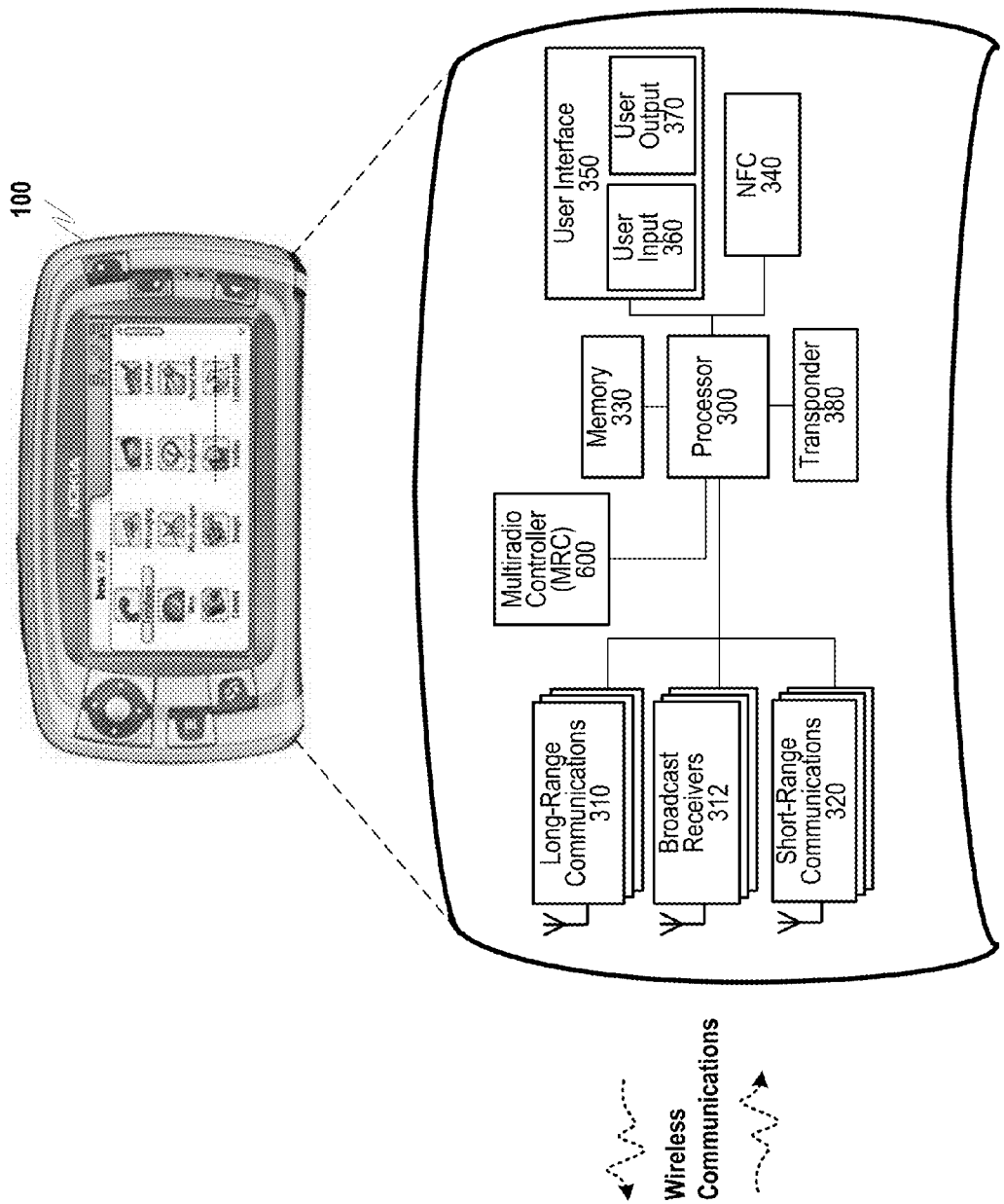

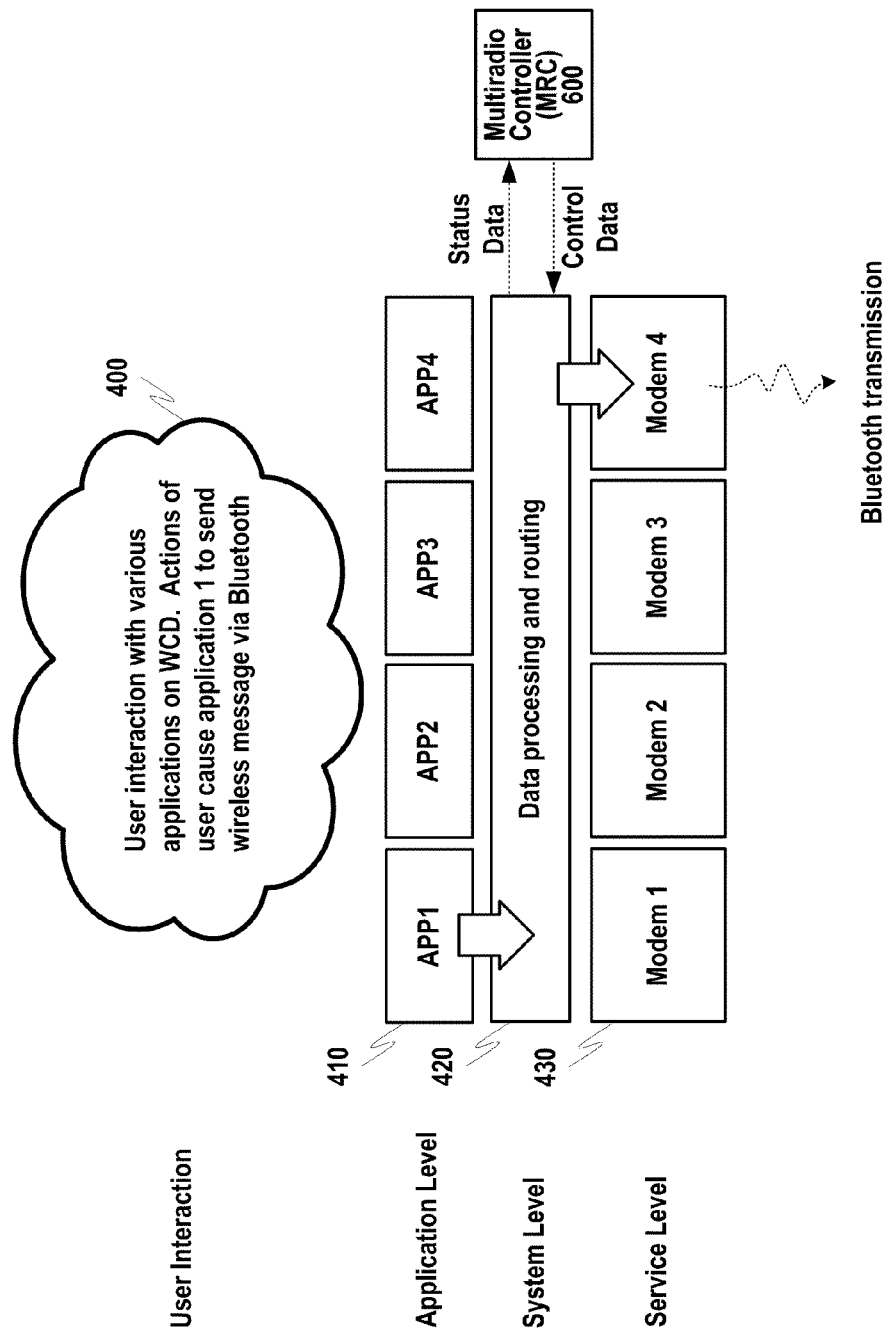

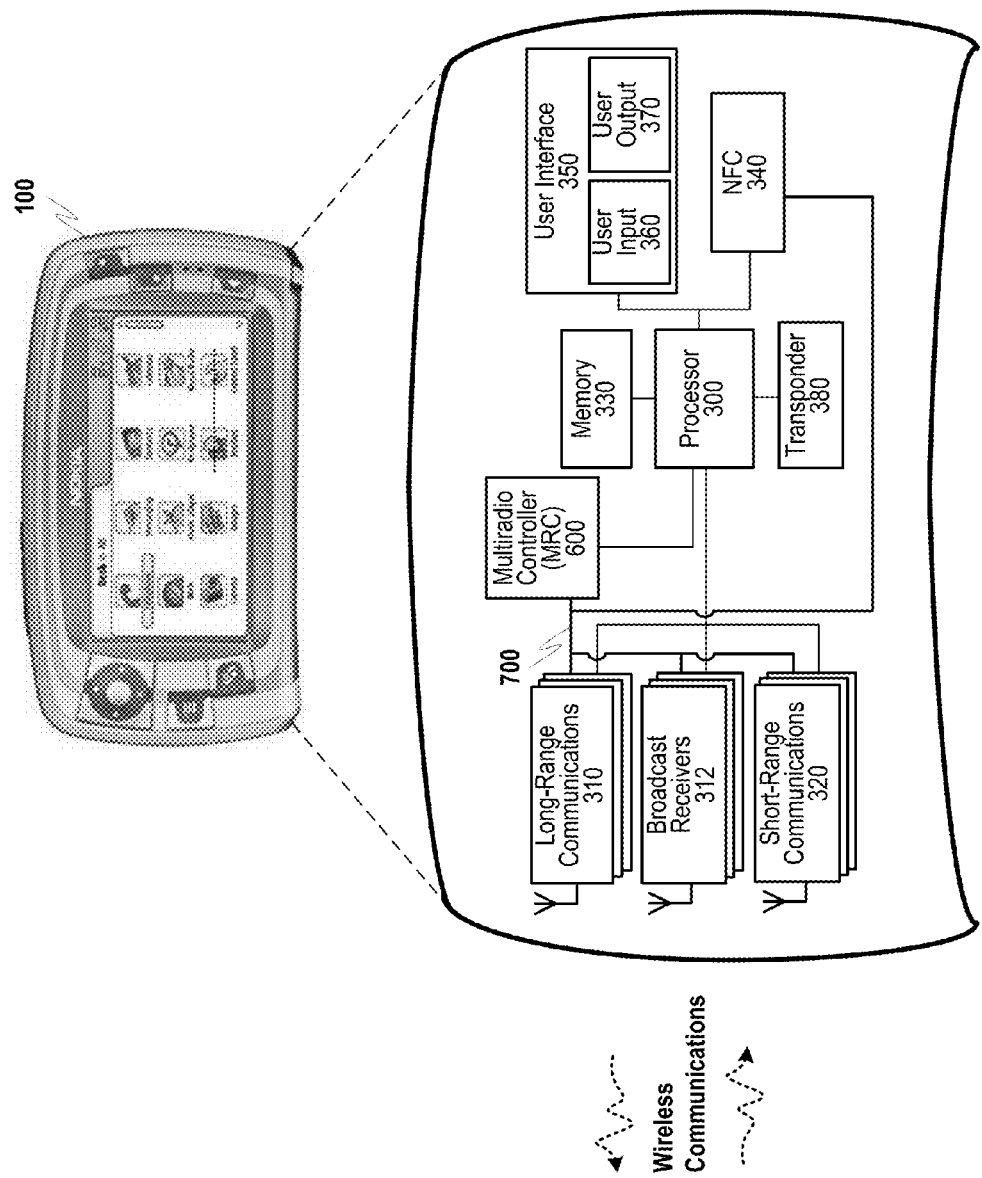

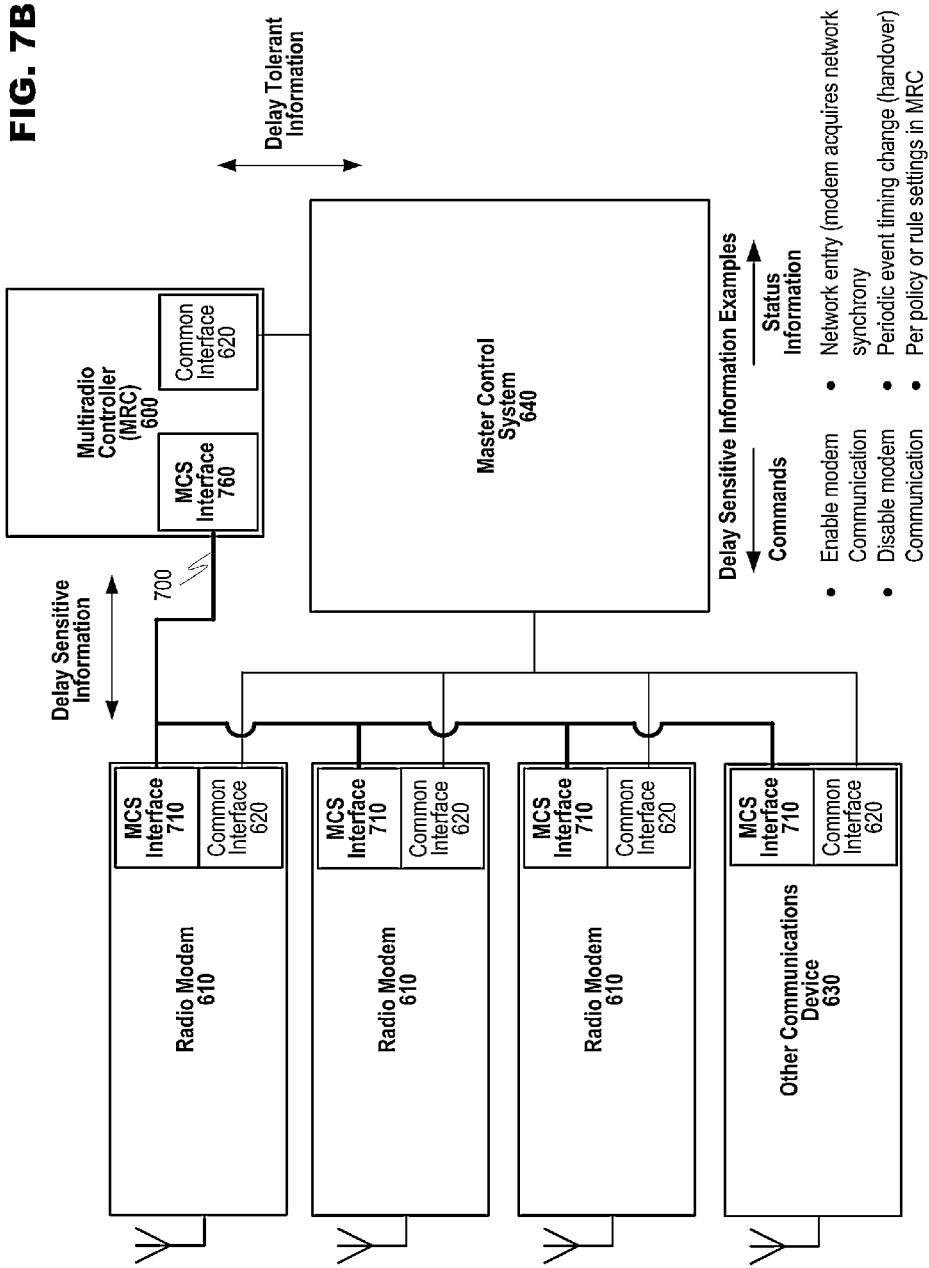

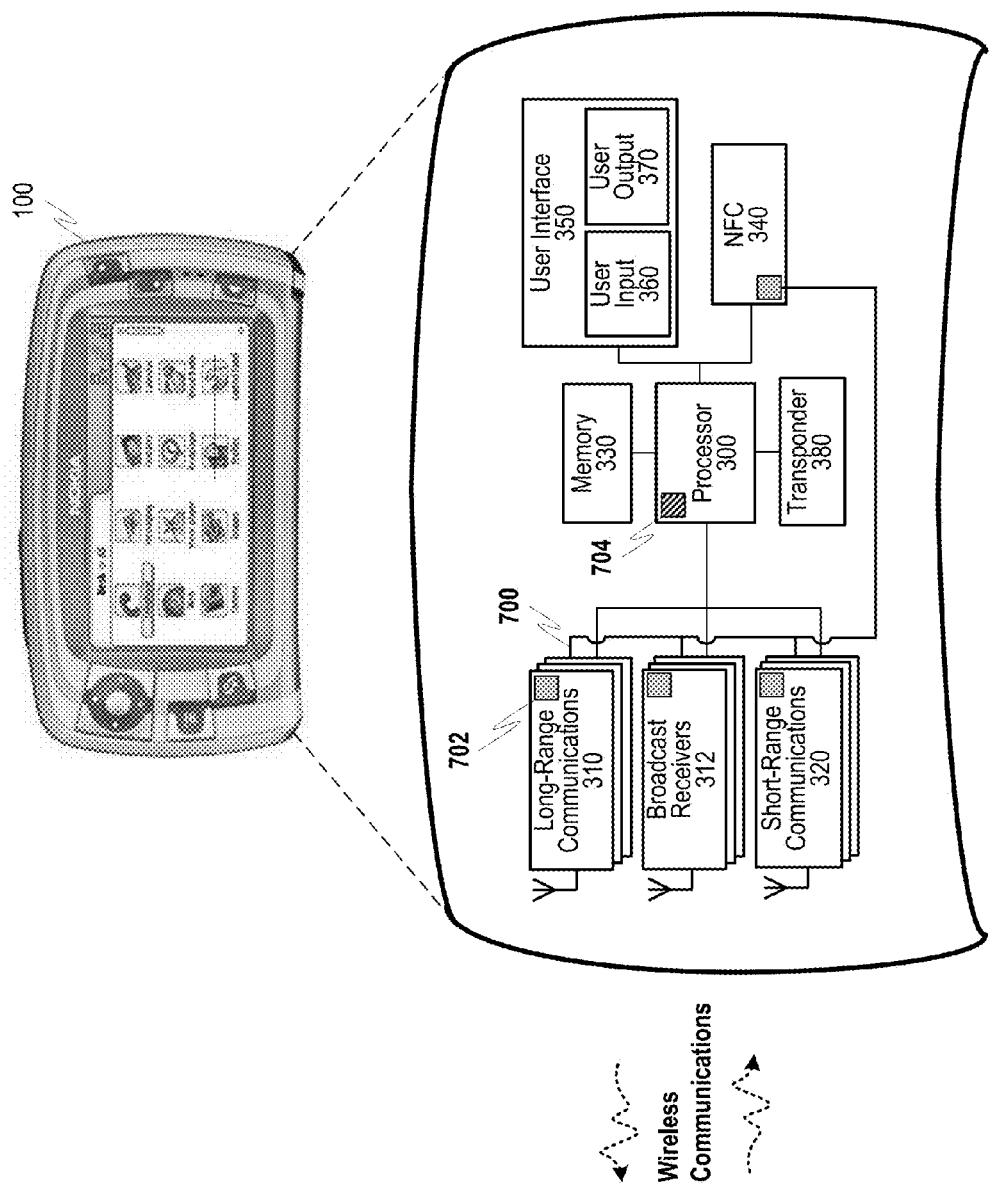

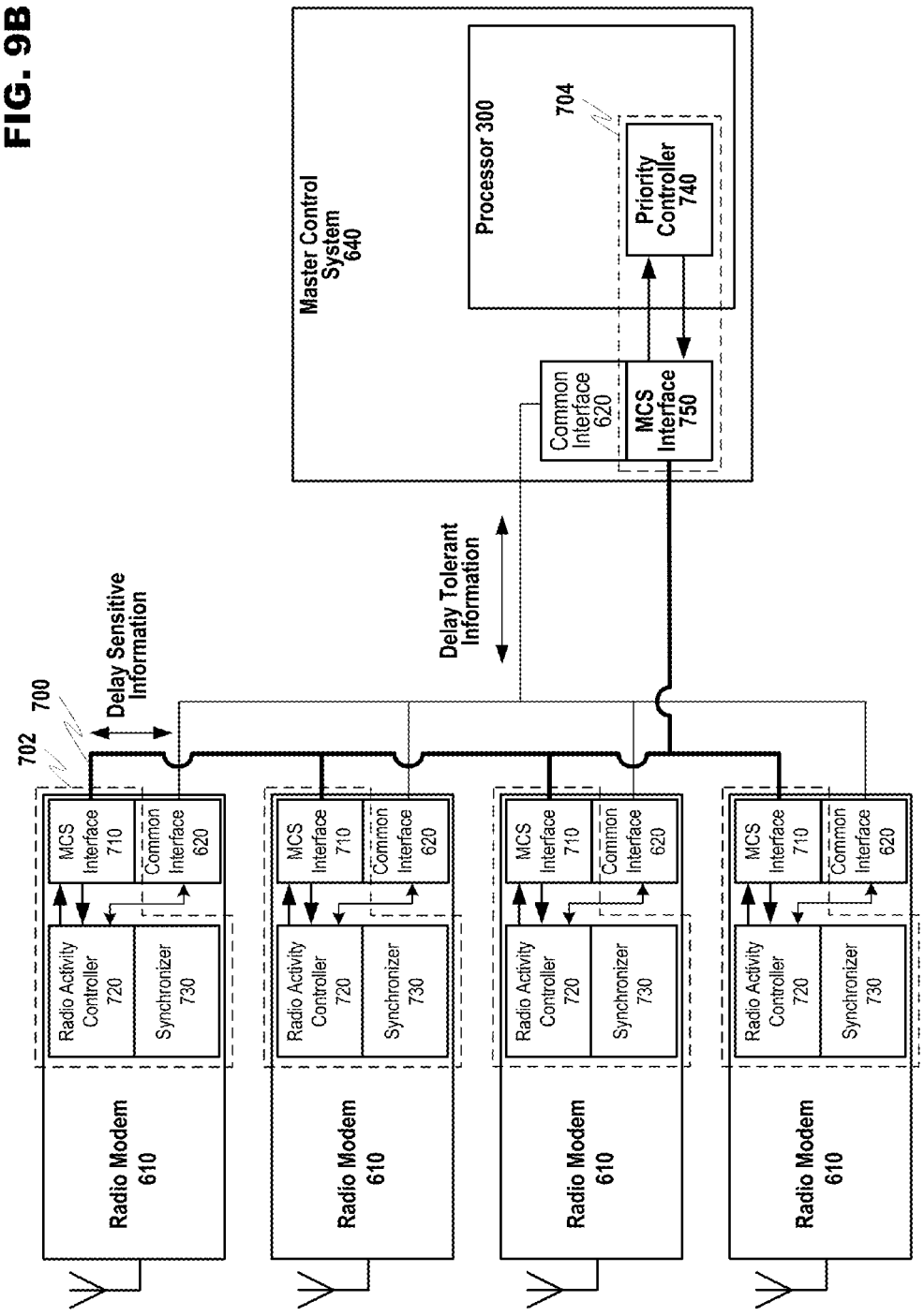

FIG. 13

| Input field | | Length (payload bits) | Description |
|---|---|---|---|
| Flow Settings | | | |
| Flow Identifier | | 16 | Bluetooth: 0x1000-0x1EFF<br>WLAN: 0x2000-0x2003<br>The 4 most significant bits are used as modem identifiers. |
| Flow Priority | | 8 | 0x00 smallest<br>0xff highest |
| Bitrate settings | | 1 | 0: Flow is of constant type<br>1: Bitrate is variable |
| Target | Bitrate | 32 | The value represents kilobits per second of data that has passed CRC or equivalent. If no checking on data integrity is done, all receive d data is counted to the bitrate.<br>0x0 : value indicates that there is no target bitrate. In this case the Error rate and Sample rate fields are not applicable. |
| | Error rate | 16 | Number of erroneous packets in a sample window.<br>0xffff : indicates that the number of errors is unlimited. |
| | Sample rate | 32 | Sample window size (in milliseconds)<br>0x0: indicates that no window is configured. Bit - and error rates are calculated incrementally from the beginning of the flow. |
| Minimum | Bitrate | 32 | The value represents kilobits  per second of data that has passed CRC or equivalent. If no checking on data integrity is done, all received data is counted to the bitrate.<br>0x0 : value indicates that there is no minimum bitrate. In this case the Error rate and Sample rate fields are not a pplicable. |
| | Error rate | 16 | Number of erroneous packets in a sample window.<br>0xffff : indicates that the number of errors is unlimited. |
| | Sample rate | 32 | Sample window size (in milliseconds).<br>0x0: indicates that no window is configured. Bit - and error rates ar e calculated incrementally from the beginning of the flow. |
| Floating priority | | 1 | 1: The priority of the flow may be lowered, if the target rate is exceeded beyond the hysteresis level. Conversely, if the target rate is not met, the priority of the flow may  be raised.<br>0: The flow priority is fixed and may not be modified. |
| Floating hysteresis | | 16 | In case the priority is floating, the hysteresis may be set. The unit of this field is the same as in the Bitrate-fields. |
| Floating priority minimum | | 8 | The minimum pr iority level that a flow can be decreased to. |
| Floating priority maximum | | 8 | The maximum priority level that a flow can be increased to. |
| Flow Measurement | | | |
| Flow Identifier | | 16 | Bluetooth: 0x1000-0x1EFF<br>WLAN: 0x2000-0x2003<br>The 4 most significant bits are used  as modem identifiers. |
| Flow Priority | | 8 | 0x0000 smallest<br>0xffff highest |
| Measurement window | | 32 | The time window in milliseconds during after which measurement results may be reported. |
| Output field | | Length (payload bits) | Description |
| Hysteresis exceeded | | - | Has  no payload. Signal itself indicates that hysteresis has been exceeded. |
| Minimum value breach | | 2 | Bit 0 set to 1: Bitrate smaller than minimum rate,<br>Bit 1 set to 1: Error rate larger than the value in the Minimum values  -- field. (Only applicable, if Minimum va lue error rate < 0xff ff. If the number of errors during the minimum value sample period exceeds 0xff ff, the number of errors is considered to be 0xff ff.) |
| Flow measurement result | | | |
| Flow Identifier | | 16 | Bluetooth: 0x1000-0x1EFF<br>WLAN: 0x2000-0x2003<br>The 4 most  significant bits are used as modem identifiers. |
| Result message | | 8 | Not supported, success, various failure codes. |
| Result value | Bitrate | 32 | Bits successfully sent/received during the measurement period. |
| | Packet rate | 32 | Average packet interval. |
| | Packet variance | 32 | Average variance of packet intervals. |
| | Error rate | 32 | Number of erroneous packets during the measurement period. |

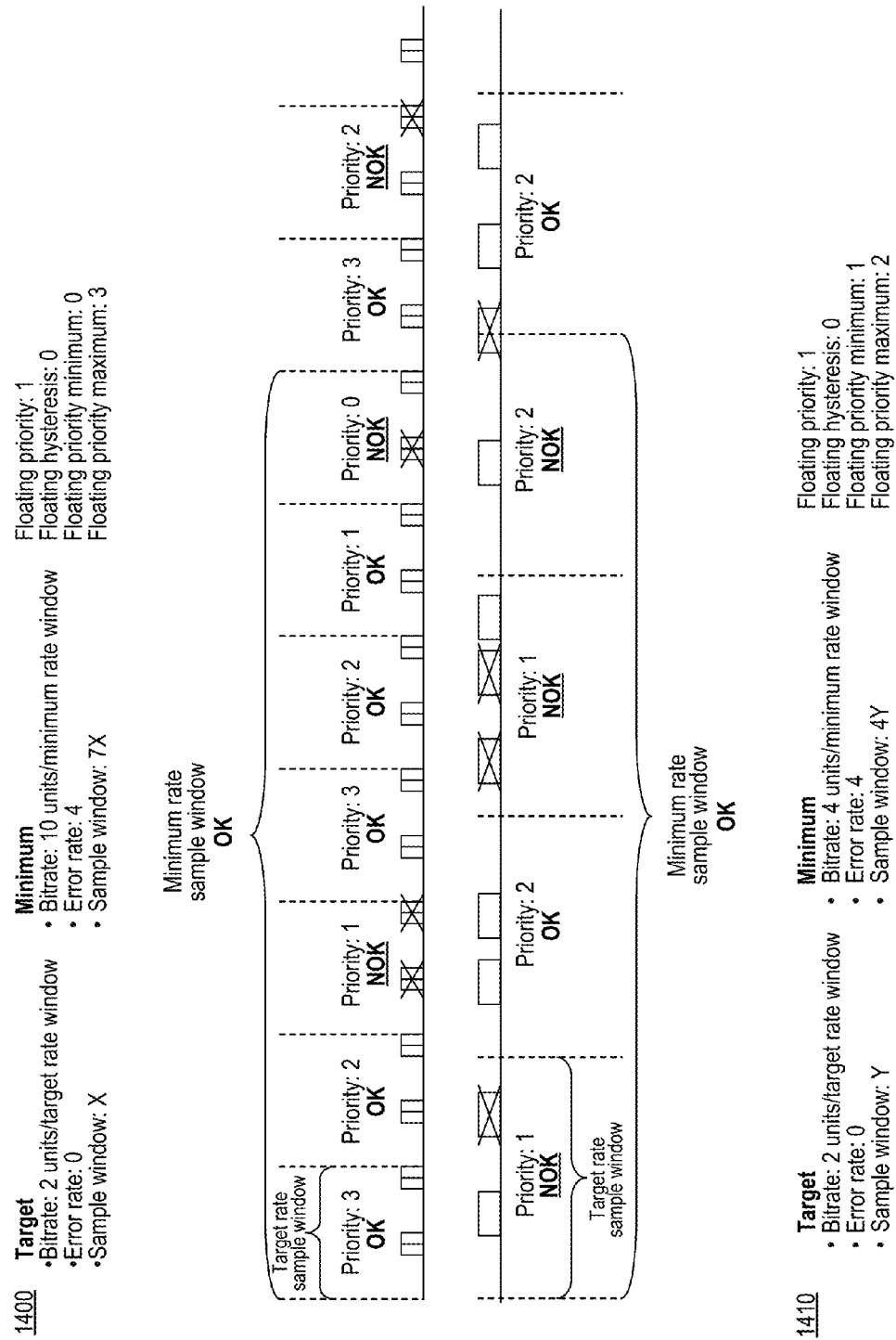

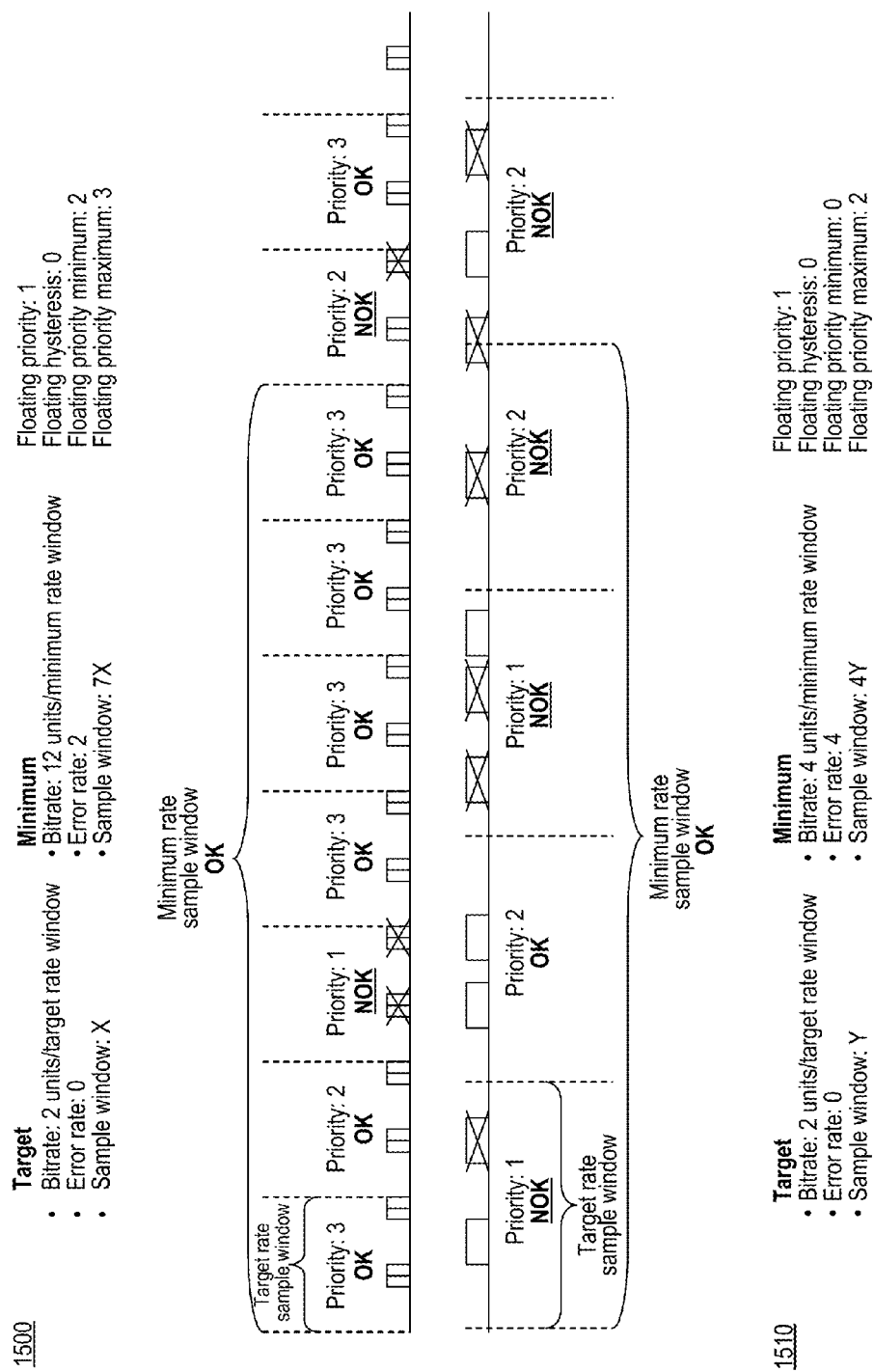

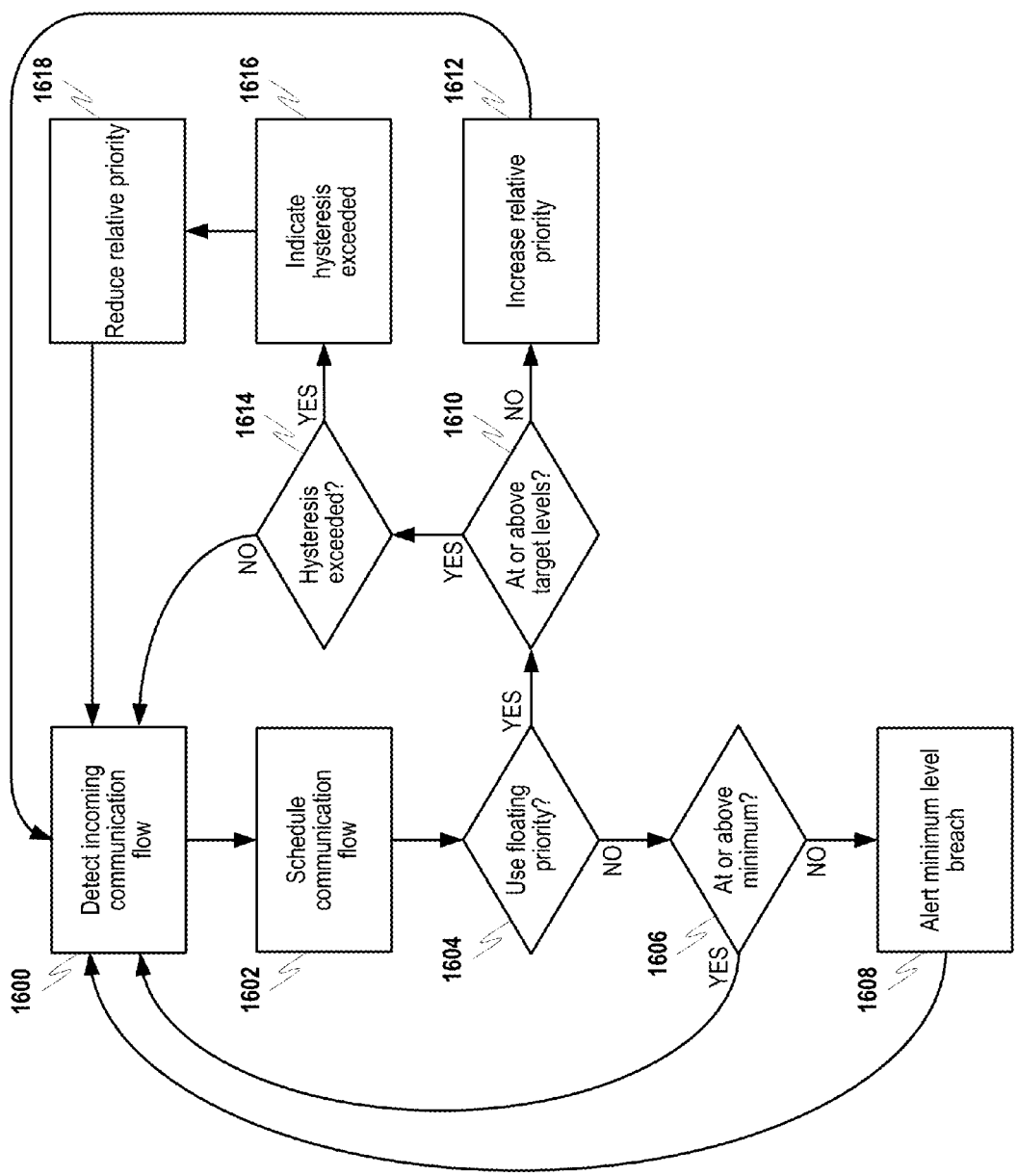

INTEROPERABILITY INTERFACE FOR MODEM CONTROL

BACKGROUND OF INVENTION

1. Field of Invention

Embodiments of the present invention relate to systems configured to facilitate communication in an apparatus, and in particular, to an interface configured to manage the operation of one or more radio modules in the apparatus.

2. Background

Improvements in the variety of different communication functionalities that may be integrated into apparatuses and the quality of service (QoS) that can be provided for these various features has allowed apparatuses enabled for wireless communication to proliferate in the global marketplace. Wireless communication devices (WCDs) have become commonplace for both personal and business use, allowing users to transmit and receive voice, text and graphical data from a multitude of geographic locations. The wireless communication networks utilized by these devices span different frequencies and cover different transmission distances. For example, mobile apparatuses that typically utilize cellular communication like GSM or CDMA for long range wireless voice or data communication may also include support for close-proximity or short-range wireless communication such as Bluetooth™, WLAN, RFID, IR, etc.

However, benefits that may be realized from providing increased functionality in a single wireless apparatus may be mitigated by interference problems related to the management of multiple concurrent wireless flows occurring in the apparatus. In at least one example scenario, active applications such as telephonic communication, email, text messaging, Internet browsers, etc. may be manipulated by users via wirelessly coupled peripheral devices (e.g., headsets, keyboards, automotive communication systems, external memory storage, etc.). These activities may result in concurrent wireless communication occurring over a variety of different wireless communication mediums. When operating in a substantially simultaneous manner, a plurality of wireless communication mediums may inadvertently interfere with each other. This self-induced interference, which may be worsened by factors such as environmental conditions, may negatively impact the quality of service (QoS) in some or all of the active communication.

Even if control resources that are enabled to coordinate wireless activity that may occur in a relatively simultaneous manner were incorporated in apparatuses, this situation may be further complicated through the utilization of radio support equipment (e.g., radio modules) from different manufacturers. In particular, each manufacturer may incorporate different wireless interaction control technologies; utilize different control strategies, etc. in their radio modules. This makes the use of equipment from different manufacturers difficult due to the need to customize interaction with each manufacturer's radio module. For example, each of the variety of radio modules would necessitate customized inputs for performing different forms of control.

SUMMARY OF INVENTION

Various example embodiments of the present invention may be directed to at least a method, apparatus, computer program, chipset and system configured to facilitate interaction with one or more radio modules incorporated within an apparatus. An interface may be provided to supply parameters usable by one or more radio modules for regulating communication. In at least one example configuration, the interface may receive information pertaining to one or more communication flows, may utilize the communication flow information to determine operational conditions for managing the one or more communication flows, and may formulate parameters for controlling one or more radio modules based on the operational condition information. These formulated parameters may then be provided to the one or more radio modules in the apparatus.

In accordance with at least one example embodiment of the present invention, communication control resources in the apparatus (e.g., a centralized or distributed multiradio controller) may perform scheduling for the one or more active communication flows. This processed information, or alternatively raw communication flow information for apparatuses lacking this type of control resource, may be provided to an interface. The interface may use this information to formulate parameters for use by control resource local to each of the one or more radio modules when controlling the activity for the one or more communication flows.

For example, the parameters provided to the one or more radio modules may govern if and how communication flow priorities set by the interface may be altered at the radio module level. For example, these parameters may allow/restrict changing the relative priority of the communication flows, may define performance levels at which local control may change the priority, may define conditions that trigger alerts, etc. The one or more radio modules may use these parameters to control operation locally in accordance with their own control strategies.

The above summarized configurations or operations of various embodiments of the present invention have been provided merely for the sake of explanation, and therefore, are not intended to be limiting. Moreover, inventive elements associated herein with a particular example embodiment of the present invention can be used interchangeably with other example embodiments depending, for example, on the manner in which an embodiment is implemented.

DESCRIPTION OF DRAWINGS

Embodiments of the invention will be understood from the following description of various example implementations, taken in conjunction with appended drawings, in which:

FIG. 3 discloses an Example structural description of the wireless communication device previously described in FIG. 2.

FIG. 4A discloses an Example operational description of a wireless communication device utilizing a wireless communication medium in accordance with at least one embodiment of the present invention.

FIG. 6A discloses an Example structural description of a wireless communication device including a multiradio controller in accordance with at least one embodiment of the present invention.

FIG. 6C discloses an Example operational description of a wireless communication device including a multiradio controller in accordance with at least one embodiment of the present invention.

FIG. 7A discloses an Example structural description of a wireless communication device including a multiradio control system in accordance with at least one embodiment of the present invention.

FIG. 7B discloses a more detailed structural diagram of FIG. 7A including the multiradio control system and the radio modems.

FIG. 8A discloses an Example structural description of a wireless communication device including a distributed multiradio control system in accordance with at least one embodiment of the present invention.

FIG. 9B discloses a more detailed structural diagram of FIG. 9A including the distributed multiradio control system and the radio modems.

FIG. 13 discloses example interface parameters that may be implemented in accordance with at least one embodiment of the present invention.

FIG. 14 discloses an example activity flow showing a potential operational effect of at least one embodiment of the present invention.

FIG. 15 discloses an example activity flow showing a potential operational effect of at least one embodiment of the present invention.

FIG. 16 discloses an example process flowchart for local control based on interface parameters in accordance with at least one embodiment of the present invention.

DESCRIPTION OF PREFERRED EMBODIMENT

While the examples of the present invention have been described in terms of Example embodiments, various changes can be made therein without departing from the spirit and scope of the invention, as described in the appended claims.

I. Wireless Communication Over Different Communication Networks

Figure 1:
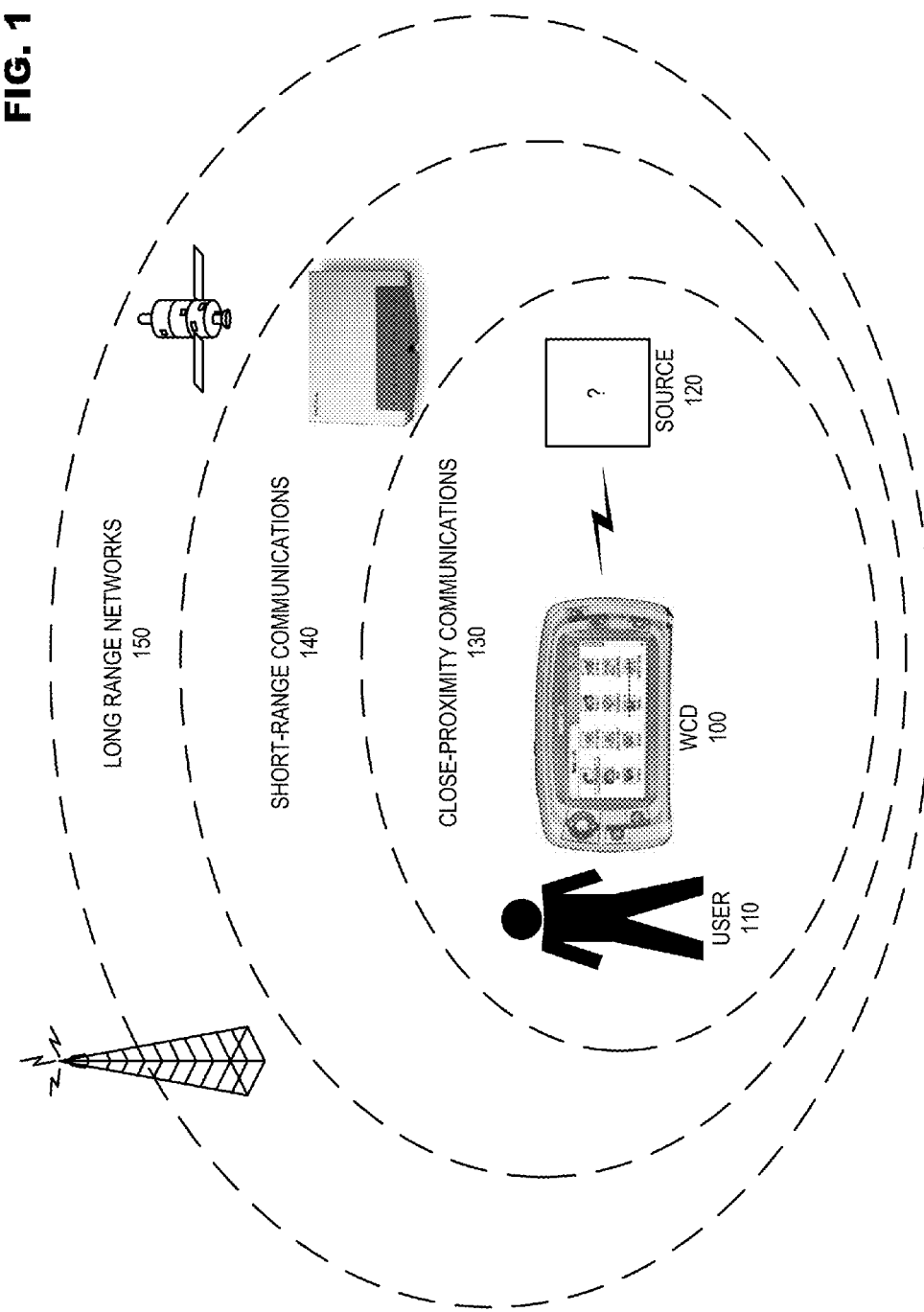
FIG. 1 discloses an Example wireless operational environment, including wireless communication mediums of different effective range.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

Close-proximity communications 130, of which near field communication (NFC) interactions are a particular example, encompass wireless technologies enabling the coupling of devices via various communication technologies such as inductive, capacitive, RF, optical, etc. For example, close-proximity communications 130 may include transponder-type interactions wherein only a scanning device is required to have its own power source. In such a transaction WCD 100 may scan source 120 via close-proximity communication. A transponder in source 120 may utilize energy and/or a clock signal contained within the scan, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly.

The transmission range may be extended if, for example, the participating devices are both capable of performing powered communication. Short-range active communication 140 may include applications where the sending and receiving devices are both active. An Example situation may include user 110 coming within effective transmission range of a Bluetooth™, WLAN, UWB, WUSB, etc. access point. In the case of Bluetooth™, a network may be automatically established to transmit information to WCD 100 possessed by user 110. The amount of information to be conveyed is unlimited, except that it must all be transferred in the time when user 110 is within effective transmission range of the access point. Due to the higher complexity of these wireless networks, additional time may be required to establish the initial connection to WCD 100, which may be increased if many devices are waiting in the area proximate to the access point. The transmission range of these networks depends on the technology, and may be from some 30 ft. to over 300 ft. with additional power boosting.

Long-range networks 150 may provide virtually uninterrupted communication coverage for WCD 100. Land-based radio stations or satellites may be used to relay various communication transactions worldwide. While these systems are extremely functional, usage of such systems is often charged on a per-minute basis to user 110, not including additional charges for data transfer (e.g., wireless Internet access). Further, the regulations governing these systems may cause additional overhead for users and providers, making these systems more cumbersome.

II. Wireless Communication Device

Example embodiments of the present invention may be implemented using a variety of wireless communication equipment. Therefore, it is important to understand the communication tools available to user 110. For example, in the case of a cellular telephone or other handheld wireless devices, the integrated data handling capabilities of the device may play an important role in facilitating transactions between the transmitting and receiving devices.

Figure 2:
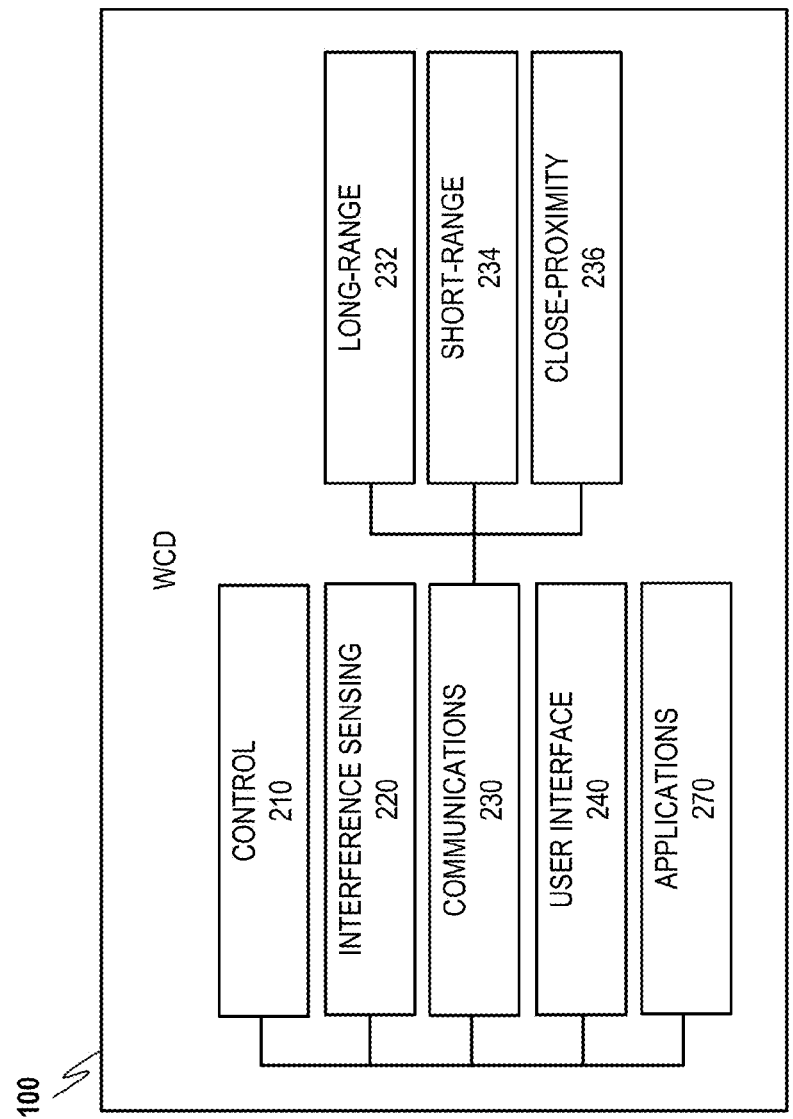
FIG. 2 discloses a modular description of an Example wireless communication device usable with at least one embodiment of the present invention.

FIG. 2 discloses a modular layout for a wireless communication device usable with various example embodiments of the present invention. WCD 100 is broken down into multiple modules representing the functional aspects of the device. These functions may be performed by the various combinations of software and/or hardware discussed below.

Control module 210 may regulate operation in the apparatus. Inputs may be received from various other modules included within WCD 100. For example, interference sensing module 220 may utilize various techniques known in the art to sense sources of environmental interference within the effective transmission range of WCD 100. Control module 210 may interpret these inputs, and in response, may issue control commands to the other modules in WCD 100.

Communications module 230 may incorporate all of the communication aspects of WCD 100. As shown in FIG. 2, communications module 230 may include, for example, long-range communications module 232, short-range communications module 234 and close-proximity module 236. Communications module 230 may utilize the functionality provided by one or more of these sub-modules to receive different types of communication from both local and long distance sources, and to transmit data to recipient devices within transmission range of WCD 100. The operation of communications module 230 may be managed by control module 210 or by control resources local to the module when, for example, responding to sensed messages, environmental influences and/or other devices in proximity to WCD 100.

User interface module 240 may include visual, audible and tactile elements that facilitate user interaction with the apparatus. For instance, actions implemented by user 110 may be interpreted by control module 210 to affect the behavior of WCD 100. For example, user-inputted data may be transmitted to other devices from communications module 230, and conversely, information from the other devices may be received in WCD 100. In at least one scenario, some or all of the information received in communications module 230 may be transferred by control module 210 to user interface module 240 for presentment to the user.

Applications module 250 may comprise hardware and/or software resources for supporting various functionalities provided by WCD 100. For example, hardware resources classified within applications module 250 such as sensors, interfaces, wired/wireless ports, etc., may be supported by software resources in applications module 250 such as utilities, interpreters, data applications, etc. The resources in applications module 250 may be accessed by various modules in WCD 100, and may in some instances be managed by control module 210.

In accordance with at least one example embodiment of the present invention, FIG. 3 discloses an example of a structural layout of WCD 100 usable for implementing the functionality of the modular system previously described with respect to FIG. 2. Processor 300 may control overall apparatus operation. Processor 300 may be coupled to a bus system for facilitating interaction with various operational modules in WCD 100, such as communications sections 310, 320 and 340. Processor 300 may be implemented with at least one microprocessor that is capable of executing software instructions stored, for example, in memory 330.

Memory 330 may include various types of fixed or removable memory. This memory random access memory (RAM), read only memory (ROM), and/or flash memory, and stores information in the form of data and software components (also referred to herein as modules). For example, executable program code may be stored on removable electronic, magnetic or optical computer readable media that is accessible by WCD 100. The executable program code may be transferred from the removable media to fixed memory in the apparatus for immediate execution or for storage for later execution. The data stored by memory 330 may be associated with particular software components such as operating system components for coordinating functionality in WCD 100. In addition, this data may be associated with databases, communications, scheduling, entertainment applications, multimedia applications, etc.

Further to the above, the software components stored by memory 330 include instructions that can be executed by processor 300. Various types of software components may be stored in memory 330. For instance, memory 330 may store software components that control the operation of communication sections 310, 320 and 340. Memory 330 may also store software components including firewalls, service guide managers, various databases, user interface managers and any communication utilities modules required to support WCD 100.

Long-range communications 310 may perform functions related to the exchange of information over large geographic areas (such as cellular networks). These communication methods include technologies from the previously described 1 G to 3 G. In addition to basic voice communication (e.g., via GSM), long-range communications 310 may operate to establish data communication sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subcomponent of long-range communications 310, or operating as an independent module, transmission receiver 312 may allow WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 may be responsible for functionality involving the exchange of information across short-range wireless networks. As described above and shown in FIG. 3, examples of short-range communications 320 are not limited to Bluetooth™, WLAN, UWB and Wireless USB connections. Accordingly, short-range communications 320 may perform functions related to the establishment of short-range connections, as well as processing related to the transmission and reception of information via such connections.

Close-proximity communications 340, also depicted in FIG. 3, may provide functionality related to the scanning of machine-readable data. For example, processor 300 may control components in close-proximity communications 340 to generate Radio Frequency (RF) signals for activating an RFID transponder, and may in turn control the reception of signals from the transponder. Other short-range scanning methods for reading machine-readable data may be classified as near field communication (NFC). NFC-type communication is not limited to infrared (IR), linear and 2-D (e.g., QR)

bar code readers (including processes for interpreting UPC labels), optical character recognition devices for reading magnetic, UV, conductive or other types of coded data that may be provided in a tag using suitable ink. In order for the close-proximity communications 340 to scan the aforementioned types of machine-readable data, hardware may be incorporated into WCD 100 which may include optical detectors, magnetic detectors, CCDs or other sensors known in the art for interpreting machine-readable information.

As further shown in FIG. 3, user interface 350 may facilitate the exchange of information with users. FIG. 3 demonstrates that user interface 350 may includes a user input 360 and a user output 370. User input 360 may include one or more components that allow users to input information. Examples of such components may include keypads, touch screens, and microphones. User output 370 may allows users to receive information from the device. Thus, user output portion 370 may include various output components, such as a display, light emitting diodes (LED), tactile emitters and one or more audio speakers. Examples of displays usable in WCD 100 may include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. In addition, a scanner may be mounted (e.g., as previously discussed above with regard to examples of NFC 340) in WCD 100 so that it can read information from other transponders in the vicinity.

Hardware corresponding to communications sections 310, 312, 320 and 340 may support the transmission and reception of signals in WCD 100. Accordingly, these portions may include components (e.g., electronics) that perform functions, such as modulation, demodulation, amplification, and filtering. Each of these portions may be locally controlled, or controlled by processor 300 in accordance with software communication components stored in memory 330. The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, NFC 340, user interface 350, transponder 380, etc. through one or more wired and/or wireless bus interfaces. Alternatively, any and/or all of the individual components discussed above may be replaced by integrated circuits in the form of programmable logic devices, gate arrays, ASICs, multi-chip modules (MCM), etc. that may be programmed to replicate the functions of the stand-alone devices. In addition, each of these components is coupled to a power source, such as a removable and/or rechargeable battery (not shown).

User interface 350 may interact with communication utility software components, also contained in memory 330, which may provide for establishment of service sessions using long-range communications 310 and/or short-range communications 320. The communication utilities component may include various routines that allow the reception of services from remote devices according to mediums such as the Wireless Application Medium (WAP), Hypertext Markup Language (HTML) variants like Compact HTML (CHTML), etc.

III. Example Operation of a Wireless Communication Device Including Potential Interference Problems Encountered FIG. 4A discloses an example communication stack diagram for understanding the operation of apparatuses in accordance with at least one example embodiment of the present invention. At the top level 400, user 110 may interact with WCD 100. The interaction involves user 110 entering information via user input 360 and receiving information from user output 370 in order to activate functionality in application level 410. In the application level, programs related to specific functionality within the device may interact with both the user and the system level. These programs include applications for visual information (e.g., web browser, DVB-H receiver, etc.), audio information (e.g., cellular telephone, voice mail, conferencing software, DAB or analog radio receiver, etc.), recording information (e.g., digital photography software, word processing, scheduling, etc.) or other information processing. Actions initiated at application level 410 may require that information to be sent from, or received into, WCD 100. In the example of FIG. 4A, data is requested to be sent to a recipient device via Bluetooth™ communication. To execute this activity, application level 410 may then call resources in the system level to initiate the required processing and routing of data.

System level 420 may process data requests and routes the data for transmission. Processing may include, for example, calculation, translation, conversion and/or packetizing the data. The information may then be routed to appropriate communication resources in the service level. If the desired communication resource is active and available in the service level 430, the packets may be routed to a radio modem for delivery via wireless transmission. There may be a plurality of modems operating using different wireless mediums. For example, in FIG. 4A, module 4 is activated and able to send packets using Bluetooth™ communication. However, a radio module (as a hardware resource) need not be dedicated only to a specific wireless medium, and may be used for different types of communication depending on the requirements of the wireless medium and the hardware characteristics of the radio modem.

Figure 4B:
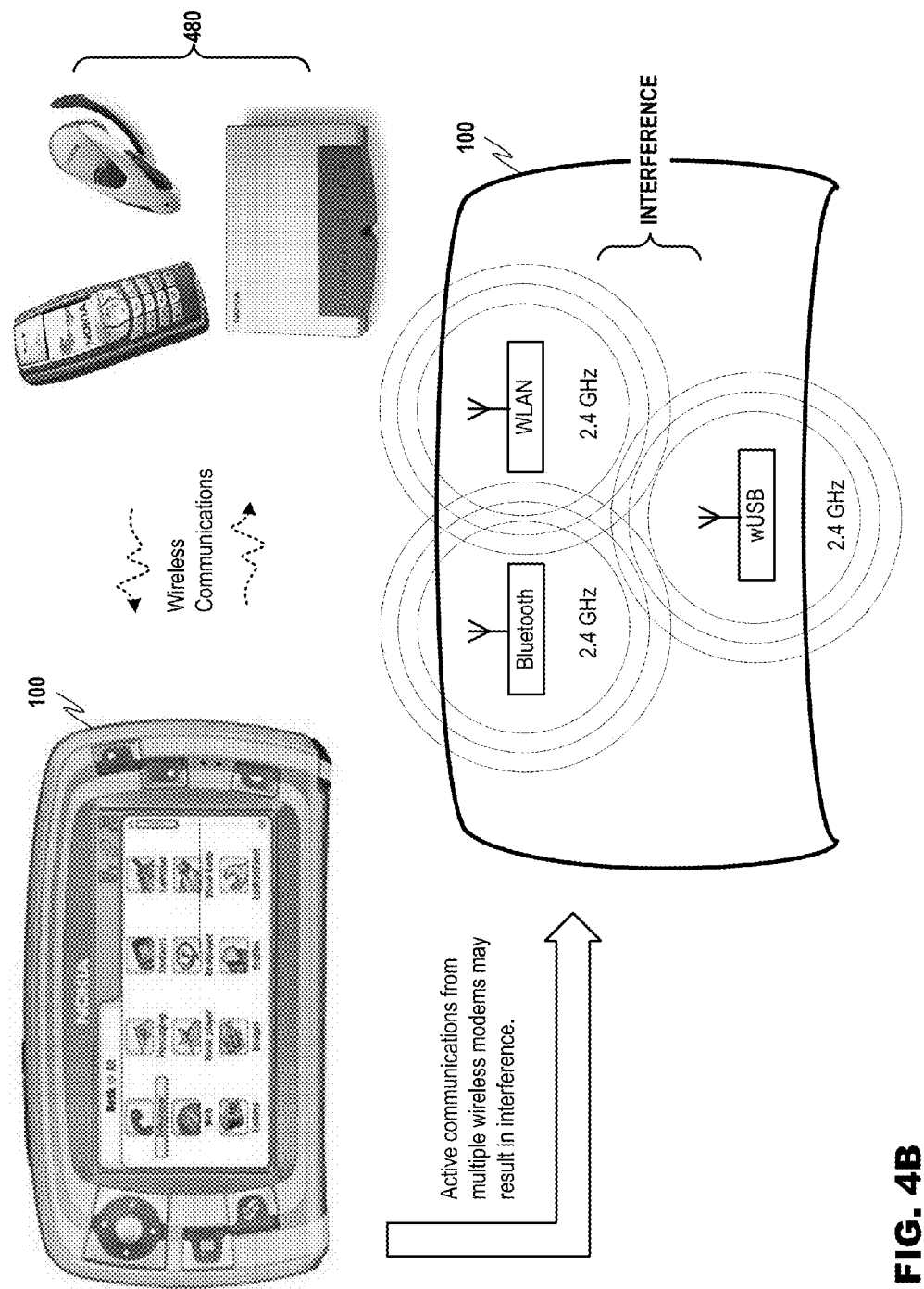
FIG. 4B discloses an operational example wherein interference occurs when utilizing multiple radio modems simultaneously within the same wireless communication device.

FIG. 4B discloses a situation where, for example, the above described example of operation may cause more than one radio modem to become active. In this case, WCD 100 is both transmitting and receiving information via wireless communication over a multitude of wireless communication mediums. WCD 100 may be interacting with a variety secondary devices such as those grouped at 480. For example, these devices may include cellular handsets communicating via long-range wireless communication like GSM, wireless headsets communicating via Bluetooth™, Internet access points communicating via WLAN, etc.

Problems may occur when some or all of these communications are carried on simultaneously in WCD 100. As further shown in FIG. 4B, multiple radio modules operating simultaneously in an apparatus may cause interference with each other. Such situations may be encountered when WCD 100 is communicating with more than one external device. In an example of an extreme scenario, devices with modems simultaneously communicating via Bluetooth™, WLAN and wireless USB would encounter substantial overlap since all of these wireless mediums operate in the 2.4 GHz band. The interference, shown as an overlapping portion of the fields depicted in FIG. 4B, may cause packets to be lost and the required retransmission of any lost packets. Retransmission causes future timeslots to be reallocated for the retransmission of lost information, resulting in a negative overall impact that may at least cause communication performance be reduced, if the signal is not lost completely. The present invention, in accordance with at least one example embodiment, seeks to manage problematic situations where possibly conflicting communications may be occurring simultaneously so that interference is minimized or totally avoided, and as a result, speed and quality are maximized.

IV. Radio Modem Signal Control in a Wireless Communication Device

Figure 5A:
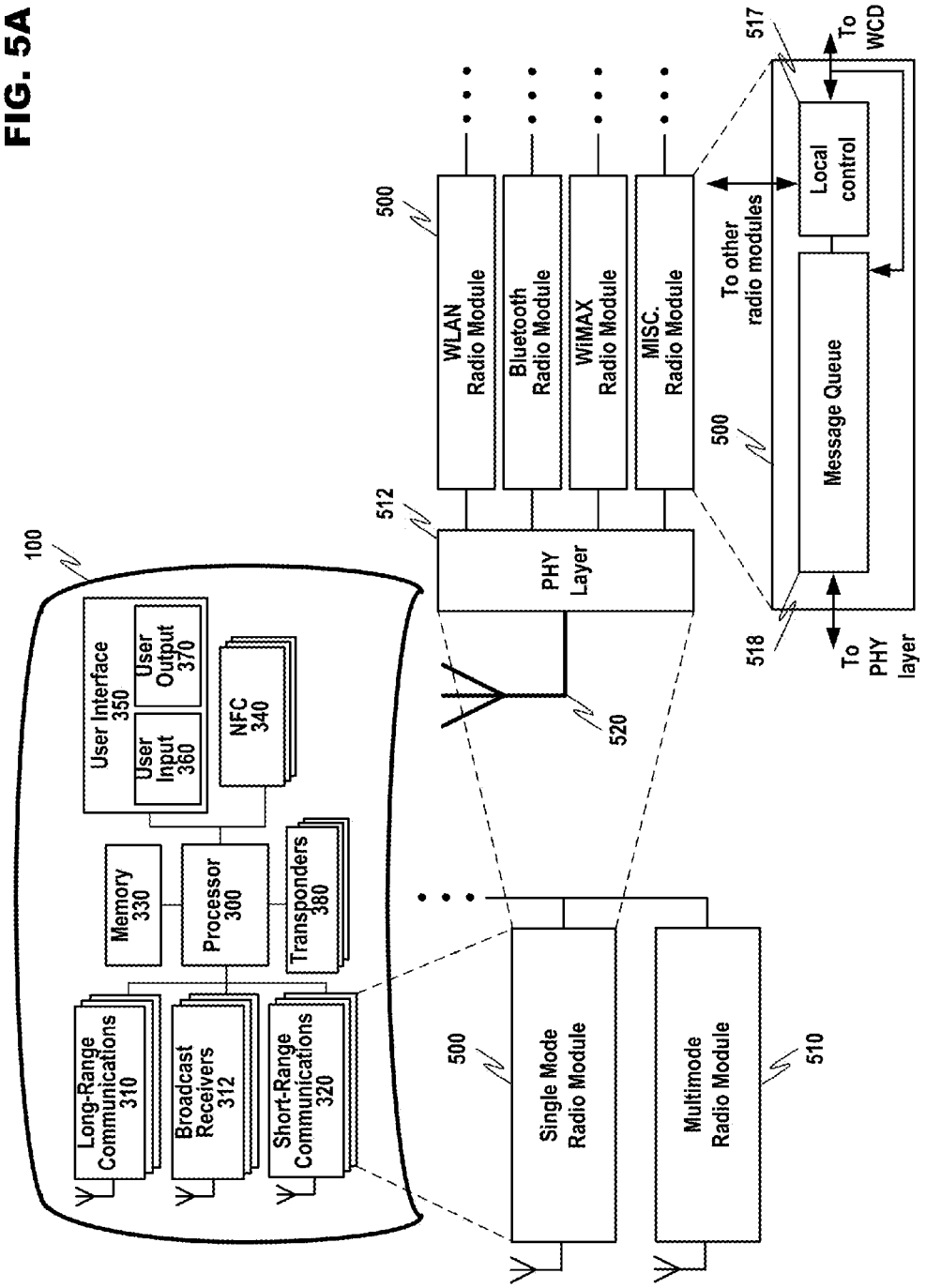
FIG. 5A discloses an example of single mode radio modules usable with at least one embodiment of the present invention.

FIG. 5A discloses examples of different types of radio modules that may be implemented in WCD 100. Choosing a particular type of radio module to implement may depend on functional requirements in WCD 100, or conversely, on limitations in the apparatus such as space or power limitations. Example radio module 500 is a single mode radio module and example radio module 510 is a multimode radio module (which is explained further with respect to FIG. 5B). Single mode radio module 500 only supports one wireless communication medium at a time (e.g., a single mode radio module may be configured to support Bluetooth™) and may share physical resources (e.g. physical layer 512) such as a common antenna 520 or an antenna array and associated hardware.

Since all single mode radio modules 500 may share the resource of physical layer 512 as depicted in FIG. 5A, some sort of local control entity may manage how each single mode radio module 500 utilizes these resources. Local controller 517 may therefore be included in each radio modem to control the usage of PHY layer 512. This local controller may take as inputs message information from other components within WCD 100 wishing to send messages via single mode radio module 500 and also information from other single mode radio modules 500 as to their current state. This current state information may include a priority level, an active/inactive state, a number of messages pending, a duration of active communication, etc. Local controller 517 may use this information to control the release of messages from message queue 518 to PHY layer 512, or further, to control the quality level of the messages sent from message queue 518 in order to conserve resources for other wireless communication mediums. The control strategy in each single mode radio module 500 may take the form of, for example, a schedule for utilization of a wireless communication medium implemented in the radio module.

Figure 5B:
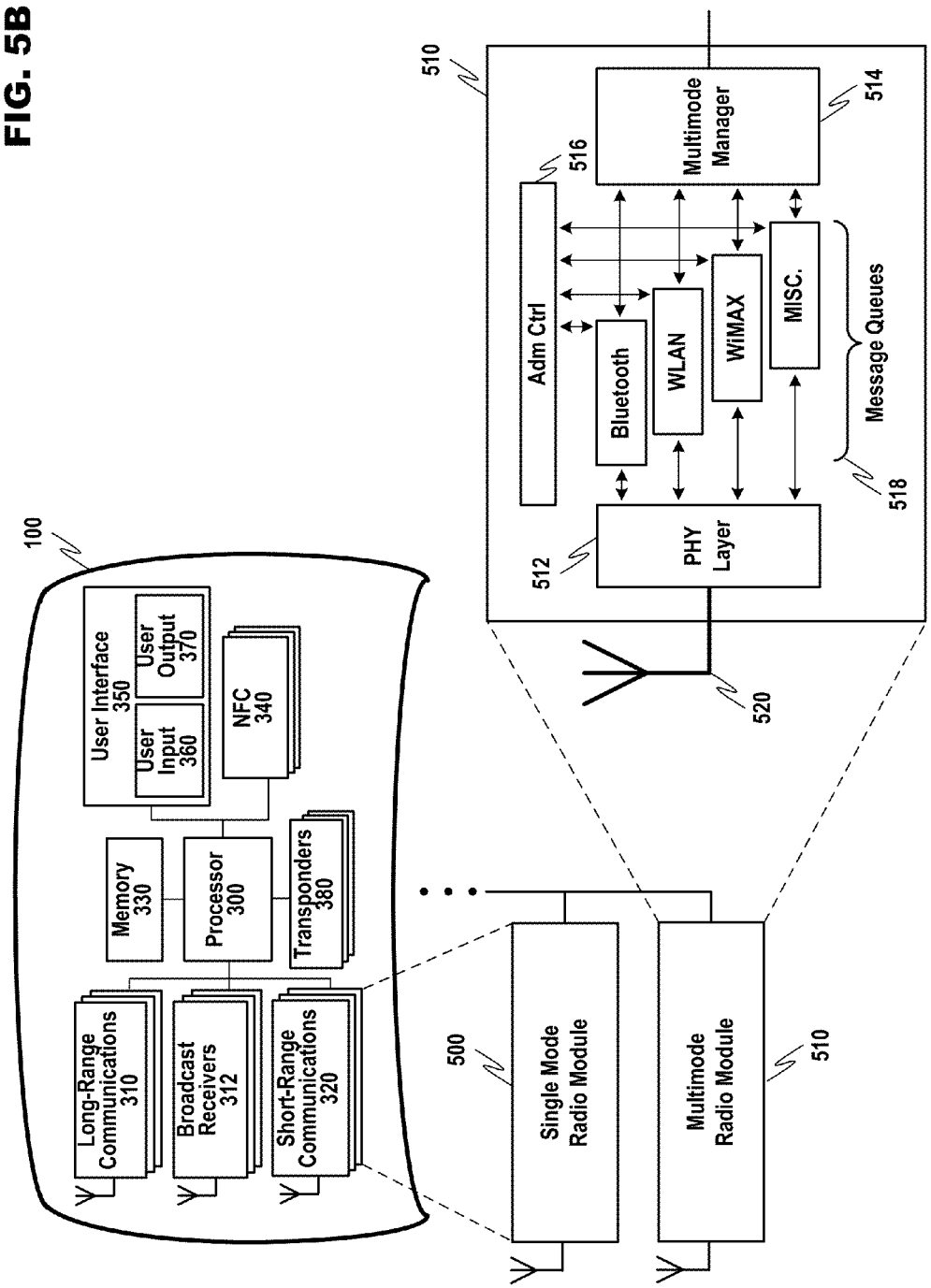
FIG. 5B discloses an example of a multimode radio module usable with at least one embodiment of the present invention.

An example of multimode radio module 510 is now discussed with respect to FIG. 5B. Multimode radio module 510 may include local control resources for managing each "radio" (e.g., software based radio control stacks) attempting to use the physical layer (PHY) resources of multimode radio module 510. In the disclosed example embodiment, multimode radio module 510 comprises at least three radio stacks or radio protocols (labeled Bluetooth, WLAN and WiMAX in FIG. 5B) that may share the PHY layer resources (e.g., hardware resources, antenna, etc.) of multimode radio module 510. It should be noted, however, that the number of radio stacks in multimode radio module 510 can vary depending on the particular implementation, and may be, for example, two in an example integrated Bluetooth/WLAN radio implementation. The disclosed example local control implementation includes an admission controller (Adm Ctrl 516) and a multimode controller (Multimode Manager 514). These local control resources may be embodied as a software program and/or in a hardware form (e.g., logic device, gate array, MCM, ASIC, etc.) in a dual-mode radio modem interface, and the radio modem interface may be coupled to, or alternatively, embedded in multimode radio module 510.

Admission control 516 may act as a gateway for the multimode radio module 510 by filtering out both different wireless communication medium requests from the operating system of WCD 100 that may be sent by multimode radio module 510 and that may further result in conflicts for multimode radio module 510. The conflict information may be sent along with operational schedule information for other radio modules to multimode manager 514 for further processing. The information received by multimode manager 514 may then be used to formulate a schedule, such as a schedule for utilization of wireless communication mediums, controlling the release of messages for transmission from the various message queues 518.

V. A Wireless Communication Device Including a Multiradio Controller

In an attempt to improve communication management in WCD 100, additional control resources dedicated to managing wireless communication may be introduced. WCD 100, as pictured in FIG. 6A, includes a multiradio controller (MRC) 600 in accordance with at least one example embodiment of the present invention. MRC 600 may communicate with the master operating system of WCD 100, which would enable communication between MRC 600 and radio modules and other similar devices in communications modules 310, 312, 320 and 340.

Figure 6B:
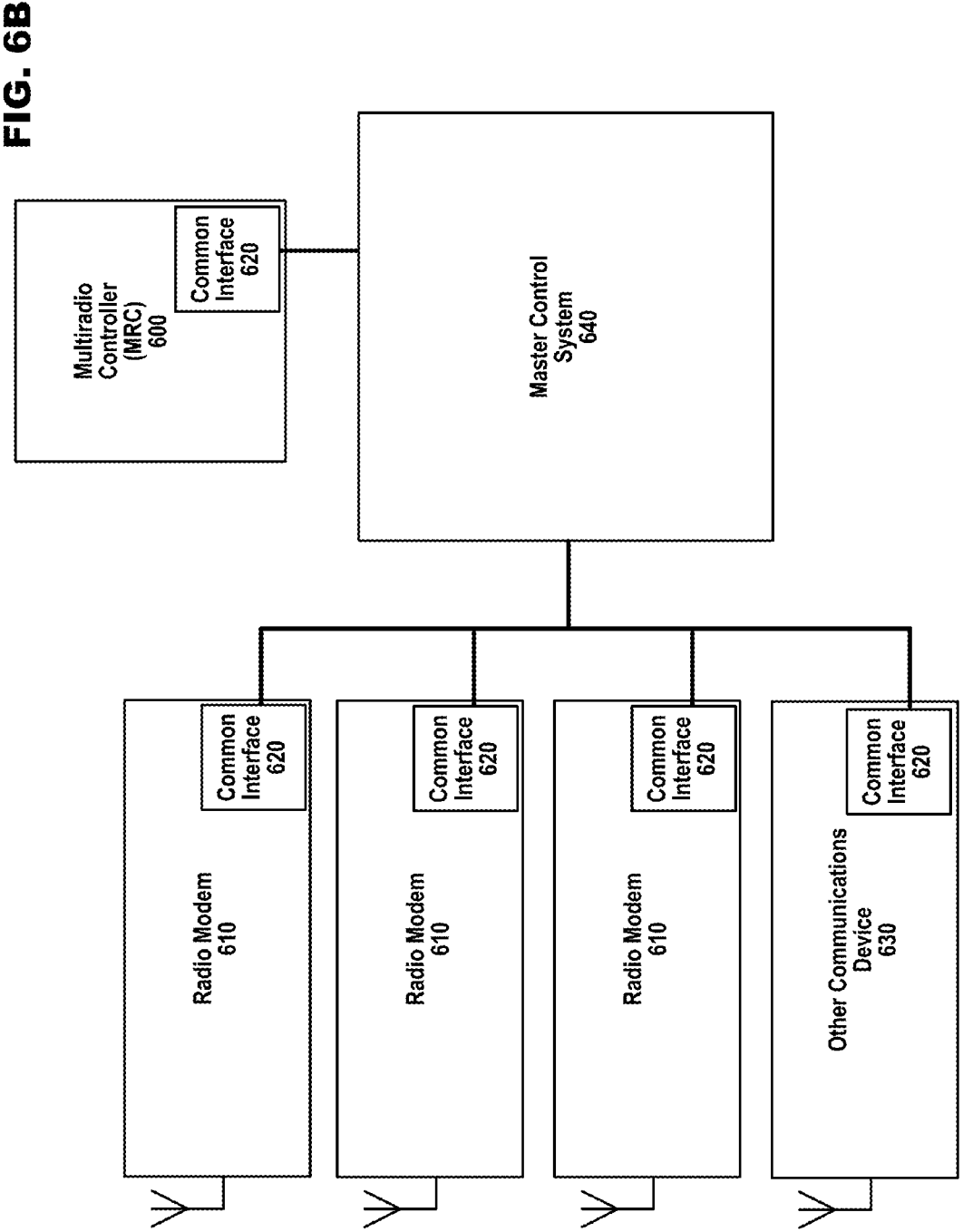
FIG. 6B discloses a more detailed structural diagram of FIG. 6A including the multiradio controller and the radio modems.

FIG. 6B discloses in detail at least one example embodiment of WCD 100, which may include multiradio controller (MRC) 600 introduced in FIG. 6A in accordance with at least one embodiment of the present invention. MRC 600 includes common interface 620 by which information may be sent or received through master control system 640. Radio modems 610 and other devices 630 have also been, and will also be, referred to as "modules" in this disclosure, as they may contain supporting hardware and/or software resources in addition to the modem itself. These resources may include control, interface and/or processing resources. For example, each radio modem 610 or similar communication device 630 (e.g., an RFID scanner for scanning machine-readable information) may also include some sort of common interface 620 for communicating with master control system 640. As a result, all information, commands, etc. occurring between radio modems 610, similar devices 630 and MRC 600 are conveyed by the communication resources of master control system 640. Possible effects of sharing resources with all the other functional modules within WCD 100 will be discussed with respect to FIG. 6C.

FIG. 6C discloses an operational diagram similar to FIG. 4A including the effect of MRC 600 in accordance with at least one embodiment of the present invention. In this system MRC 600 may receive operational data from the master operating system of WCD 100, concerning for example applications running in application level 410, and status data from the various radio communication devices in service level 430. MRC 600 may use this information to issue scheduling commands to the communication devices in service level 430 in an attempt to avoid communication problems. However, problems may occur when the operations of WCD 100 are fully employed. Since the various applications in application level 410, the operating system in system level 420, the communication devices in service level 430 and MRC 600 must all share the same communication system, delays may occur when all aspects of WCD 100 are trying to communicate using common interface system 620. As a result, delay sensitive information regarding both communication resource status information and radio modem 610 control information may become delayed, nullifying any beneficial effect from the incorporation of MRC 600. Therefore, a system better able to handle the differentiation and routing of delay sensitive information is required if the beneficial effect of MRC 600 is to be realized.

VI. A Wireless Communication Device Including a Multiradio Control System

FIG. 7A introduces MRC 600 as part of a multiradio control system (MCS) 700 in WCD 100 in accordance with at least one example embodiment of the present invention. MCS 700 may directly link the communication resources of modules 310, 312, 320 and 340 to MRC 600. MCS 700 may therefore provide a dedicated low-traffic communication structure for carrying delay sensitive information both to and from MRC 600.

Additional detail regarding this particular implementation is shown in FIG. 7B. MCS 700 may form a direct link between MRC 600 and the communication resources of WCD 100. This link may be established by a system of dedicated MCS interfaces 710 and 760. For example, MCS interface 760 may be coupled to MRC 600. MCS Interfaces 710 may connect radio modems 610 and other similar communication devices 630 to MCS 700 in order to form a dedicated information conveyance for allowing delay sensitive information to travel to and from MRC 600. In this way, the abilities of MRC 600 may no longer be influenced by the processing load of master control system 640. Any information that is conveyed to/from MRC 600 via master control system 640 may be deemed delay tolerant, and thus, the actual arrival time of this information does not substantially influence system performance. On the other hand, all delay sensitive information may be conveyed by MCS 700, which is insulated from the current load state of the master control system.

Figure 7C:
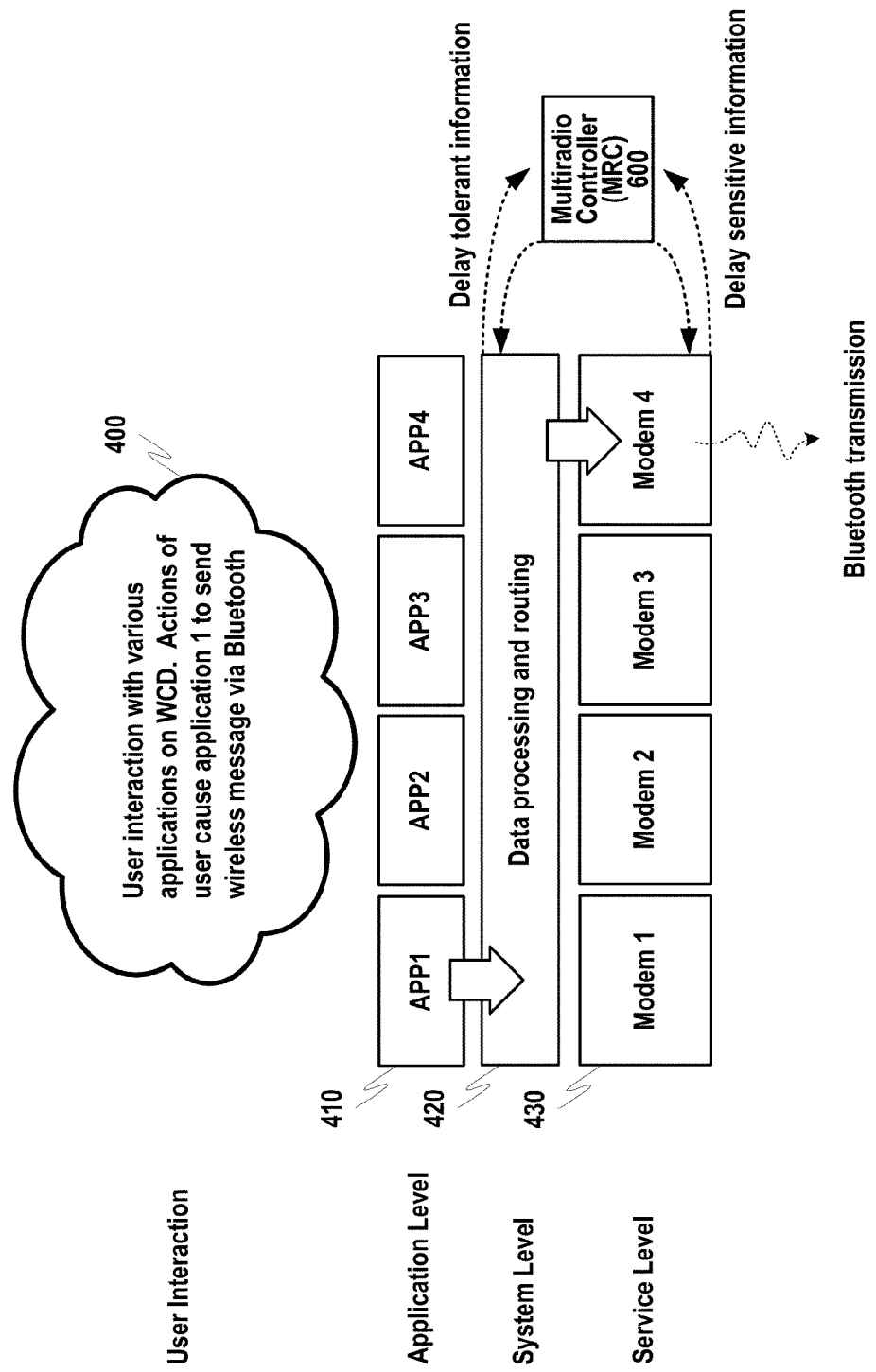
FIG. 7C discloses an Example operational description of a wireless communication device including a multiradio control system in accordance with at least one embodiment of the present invention.

In accordance with at least one example embodiment of the present invention, a possible effect of MCS 700 is seen in FIG. 7C. MCS 700 allows information to be received in MRC 600 from at least two sources. System level 420 may continue to provide information to MRC 600 through master control system 640. In addition, service level 430 may specifically provide delay sensitive information conveyed by MCS 700. MRC 600 may distinguish between these two classes of information and act accordingly. Delay tolerant information may include information that typically does not change when radio modules are actively engaged in communication, such as radio mode information (e.g., GPRS, Bluetooth™, WLAN, etc.), priority information that may be defined by user settings, the specific service the radio is driving (QoS, real time/non real time), etc. Since delay tolerant information changes infrequently, it may be delivered in due course by master control system 640 of WCD 100. Alternatively, delay sensitive (or time sensitive) information includes at least modem operational information that may frequently change during the course of a wireless connection, and therefore, requires immediate update. As a result, delay sensitive information may need to be delivered directly from the plurality of radio modems 610 to MRC 600 via MCS interfaces 710 and 760, and may include radio modem synchronization information. Delay sensitive information may be provided in response to a request by MRC 600, or may be delivered as a result of a change in radio modem settings during transmission, as will be discussed with respect to synchronization below.

VIII. A Wireless Communication Device Including a Distributed Multiradio Control System FIG. 8A discloses an alternative implementation in accordance with at least one example embodiment of the present invention, wherein a distributed multiradio control system (MCS) 700 is introduced into WCD 100. Distributed MCS 700 may, in some instances, provide a perceived advantage over centralized MRC 600 by distributing radio control into components that are already components of WCD 100. A substantial amount of communication management operations may therefore be localized to the various communication resources, such as radio modems (modules) 610, reducing the overall amount of control command traffic in WCD 100.

MCS 700, in this example, may be implemented utilizing various bus structures, including the I$^2$C interface commonly found in portable electronic devices, as well as emerging standards, such as SLIMbus, and other architectures that are now under development. I$^2$C is a multi-master bus, wherein multiple devices can be connected to the same bus and each one can act as a master through initiating a data transfer. I$^2$C buses contain at least two communication lines, an information line and a clock line. When an apparatus has information to transmit, it may assume a master role and transmits both its clock signal and information to a recipient device. SLIMbus, on the other hand, utilizes a separate, non-differential physical layer that runs at rates of 50 Mbits/s or slower over just one lane. It is being developed by the Mobile Industry Processor Interface (MIPI) Alliance to replace today's I$^2$C and I$^2$S interfaces while offering more features and requiring the same or less power than the two combined.

MCS 700 may directly link distributed control components 702 in modules 310, 312, 320 and 340. Another distributed control component 704 may reside in master control system 640. It is important to note that distributed control component 704 shown in processor 300 is not limited only to this embodiment, and may reside in any appropriate system module within WCD 100. The addition of MCS 700 may provide a dedicated low-traffic communication structure for carrying delay sensitive information both to and from the various distributed control components 702.

Figure 8B:
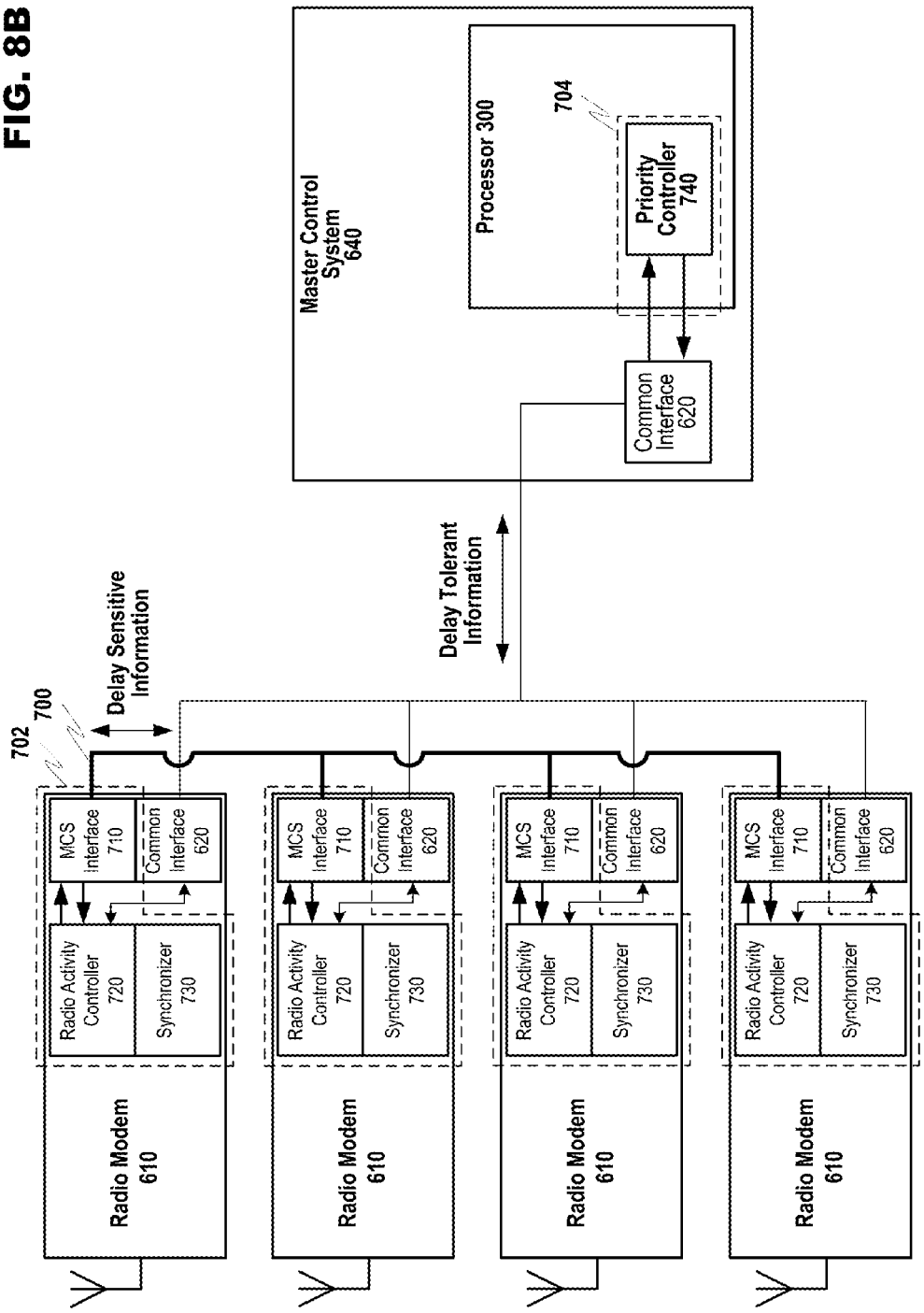
FIG. 8B discloses a more detailed structural diagram of FIG. 8A including the distributed multiradio control system and the radio modems.

The example implementation described with respect to FIG. 8A is disclosed in more detail in FIG. 8B. MCS 700 may form a direct link between distributed control components 702 within WCD 100. Distributed control components 702 in radio modems 610 (together forming a "module") may, for example, consist of MCS interface 710, radio activity controller 720 and synchronizer 730. Radio activity controller 720 uses MCS interface 710 to communicate with distributed control components in other radio modems 610. Synchronizer 730 may be utilized to obtain timing information from radio modem 610 to satisfy synchronization requests from any of the distributed control components 702. Radio activity controller 702 may also obtain information from master control system 640 (e.g., distributed control component 704) via common interface 620. As a result, any information communicated by master control system 640 to radio activity controller 720 through common interface 620 may be deemed delay tolerant, and therefore, the actual arrival time of this information does not substantially influence communication system performance. On the other hand, all delay sensitive information may be conveyed by MCS 700, and therefore is insulated from master control system overloading.

As previously stated, a distributed control component 704 may exist within master control system 640. Some aspects of this component may reside in processor 300 as, for example, an executable software routine for monitoring and coordinating the behavior of radio activity controllers 720. Processor 300 is shown to contain priority controller 740, which may be utilized to monitor and determine priority between active radio modems 610. Priority may be determined by rules and/or conditions stored in priority controller 740. Modems that become active may request priority information from priority controller 740. Further, modems that go inactive may notify priority controller 740 so that the relative priority of the remaining active radio modems 610 may be adjusted accordingly. Priority information is usually not considered delay sensitive because it is mainly updated when radio modems 610 activate/deactivate, and therefore, does not frequently change during the course of an active communication connection in radio modems 610. As a result, this information may be conveyed to radio modems 610 using common interface system 620 in at least one embodiment of the present invention.

Figure 8C:
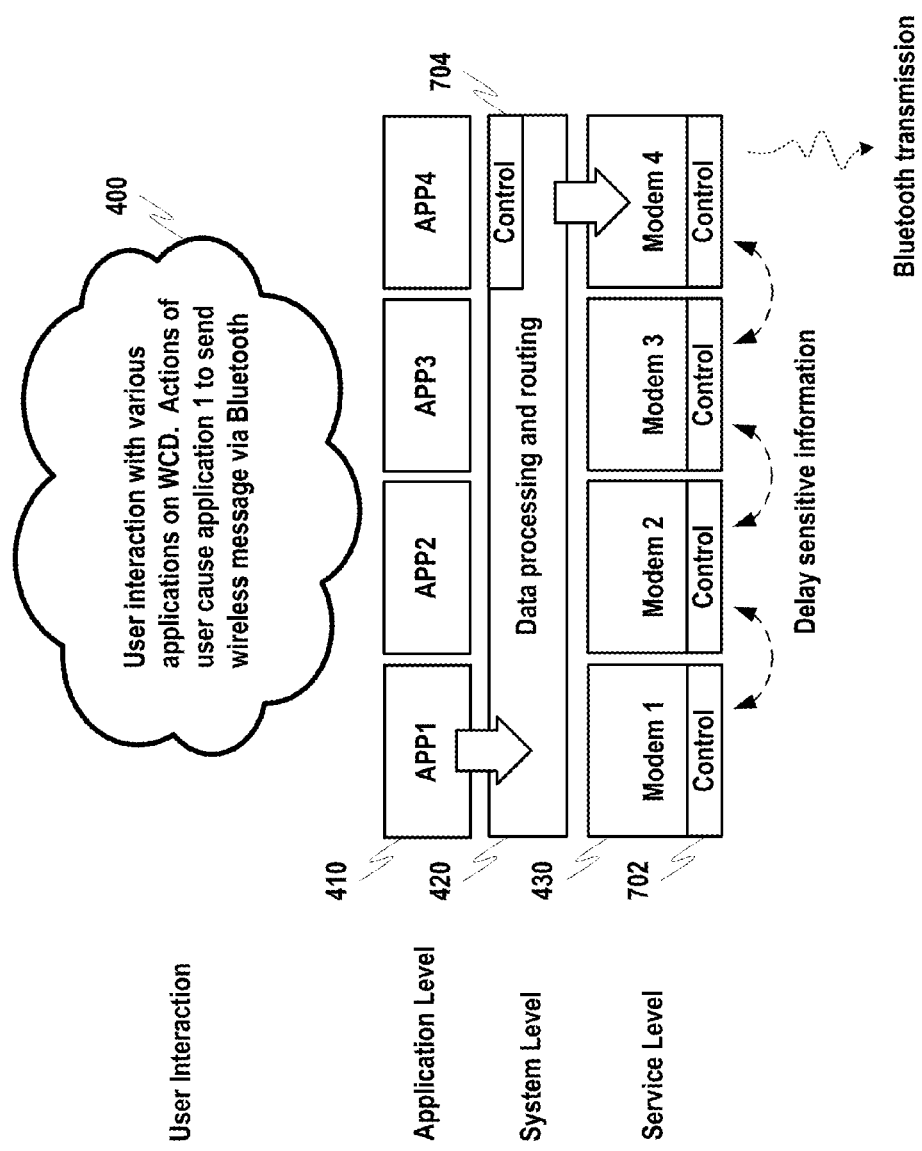
FIG. 8C discloses an Example operational description of a wireless communication device including a distributed multiradio control system in accordance with at least one embodiment of the present invention.

At least one effect of distributed control MCS 700 is seen in FIG. 8C. System level 420 may continue to provide delay tolerant information to distributed control components 702 through master control system 640. In addition, distributed control components 702 in service level 430, such as modem activity controllers 720, may exchange delay sensitive information with each other via MCS 700. Each distributed control component 702 may distinguish between these two classes of information and act accordingly. Delay tolerant information may include information that typically does not change when radio modems are actively communicating, such as radio mode information (e.g., GPRS, Bluetooth™, WLAN, etc.), priority information (e.g., defined by user settings), the specific service the radio is driving (QoS, real time/non real time), etc. Since delay tolerant information changes infrequently, it may be delivered in due course by master control system 640. Alternatively, delay sensitive (or time sensitive) information may include modem operational information that frequently changes during the course of a wireless connection, and therefore, requires immediate update. Delay sensitive information needs to be delivered directly between distributed control components 702, and may include radio modem synchronization and activity control information. Delay sensitive information may be provided in response to a request, or may be delivered as a result of a change in radio modem, which will be discussed with respect to synchronization below.

MCS interface 710 may be used to (1) Exchange synchronization information, and (2) Transmit identification or prioritization information between various radio activity controllers 720. In addition, as previously stated, MCS interface 710 is used to communicate the radio parameters that are delay sensitive from a controlling point of view. MCS interface 710 can be shared between different radio modems (multipoint) but it cannot be shared with any other functionality that could limit the usage of MCS interface 710 from a latency point of view.

The control signals sent on MCS 700 that may enable/disable a radio modem 610 should be built on a modem's periodic events. Each radio activity controller 720 may obtain this information about a radio modem's periodic events from synchronizer 730. This kind of event can be, for example, frame clock event in GSM (4.615 ms), slot clock event in Bluetooth™ (625 us) or targeted beacon transmission time in WLAN (100 ms) or any multiple of these. A radio modem 610 may send its synchronization indications when (1) Any radio activity controller 720 requests it, (2) a radio modem internal time reference is changed (e.g. due to handover or handoff). The latency requirement for the synchronization signal is not critical as long as the delay is constant within a few microseconds. The fixed delays can be taken into account in the scheduling logic of radio activity controller 710.

For predictive wireless communication mediums, the radio modem activity control may be based on knowledge of when the active radio modems 610 are about to transmit (or receive) in the specific connection mode in which the radios are currently operating. The connection mode of each radio modem 610 may be mapped to the time domain operation in their respective radio activity controller 720. In the case of GSM speech connections, for example, priority controller 740 may have knowledge about all traffic patterns of GSM. This information may be transferred to the appropriate radio activity controller 720 when radio modem 610 becomes active, which may then recognize that the speech connection in GSM includes one transmission slot of length 577 µs, followed by an empty slot after which is the reception slot of 577 µs, two empty slots, monitoring (RX on), two empty slots, and then it repeats. Dual transfer mode means two transmission slots, empty slot, reception slot, empty slot, monitoring and two empty slots. When all traffic patterns that are known a priori by the radio activity controller 720, it only needs to know when the transmission slot occurs in time to gain knowledge of when the GSM radio modem is active. This information may be obtained by synchronizer 730. Active radio modems 610 that are about to transmit (or receive) checks every time whether the modem activity control signal from its respective radio activity controller 720 permits communication. Radio activity controller 720 is always either allowing or disabling the transmission of one full radio transmission block (e.g. GSM slot).

Figure 9A:
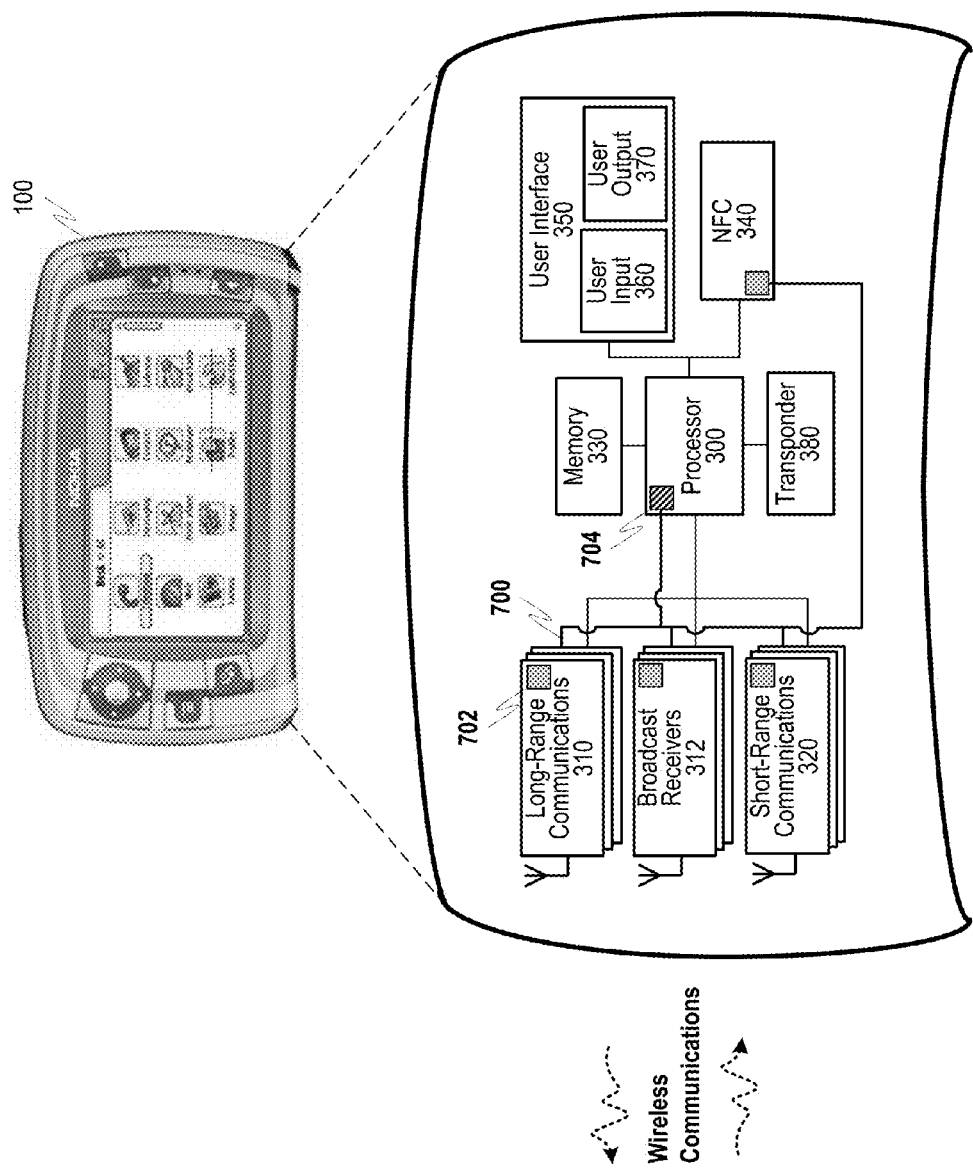
FIG. 9A discloses an Example structural description of a wireless communication device including a distributed multiradio control system in accordance with an alternative embodiment of the present invention.

VIII. A Wireless Communication Device Including an Alternative Example of a Distributed Multiradio Control System An alternative distributed control configuration in accordance with at least one example embodiment of the present invention is disclosed in FIG. 9A-9C. In FIG. 9A, distributed control components 702 are still linked by MCS 700. However, now distributed control component 704 is also directly coupled to distributed control components 702 via an MCS interface. As a result, distributed control component 704 may also utilize and benefit from MCS 700 for transactions involving the various communication components of WCD 100.

Referring now to FIG. 9B, the example configuration where distributed control component 704 is included on MCS 700 is shown in more detail. Distributed control component 704 includes at least priority controller 740 coupled to MCS interface 750. MCS interface 750 allows priority controller 740 to send information to, and receive information from, radio activity controllers 720 via a low-traffic connection dedicated to the coordination of communication resources in WCD 100. As previously stated, the information provided by priority controller 740 may not be deemed delay sensitive information, however, the provision of priority information to radio activity controllers 720 via MCS 700 may improve the overall communication efficiency of WCD 100. Performance may improve because quicker communication between distributed control components 702 and 704 may result in faster relative priority resolution in radio activity controllers 720. Further, the common interface system 620 of WCD 100 will be relieved of having to accommodate communication traffic from distributed control component 704, reducing the overall communication load in master control system 640. A further benefit may be realized in enhanced communication control flexibility. New features may be introduced into priority controller 740 without worrying about whether the messaging between control components will be delay tolerant or sensitive because an MCS interface 710 is already available at this location.

Figure 9C:
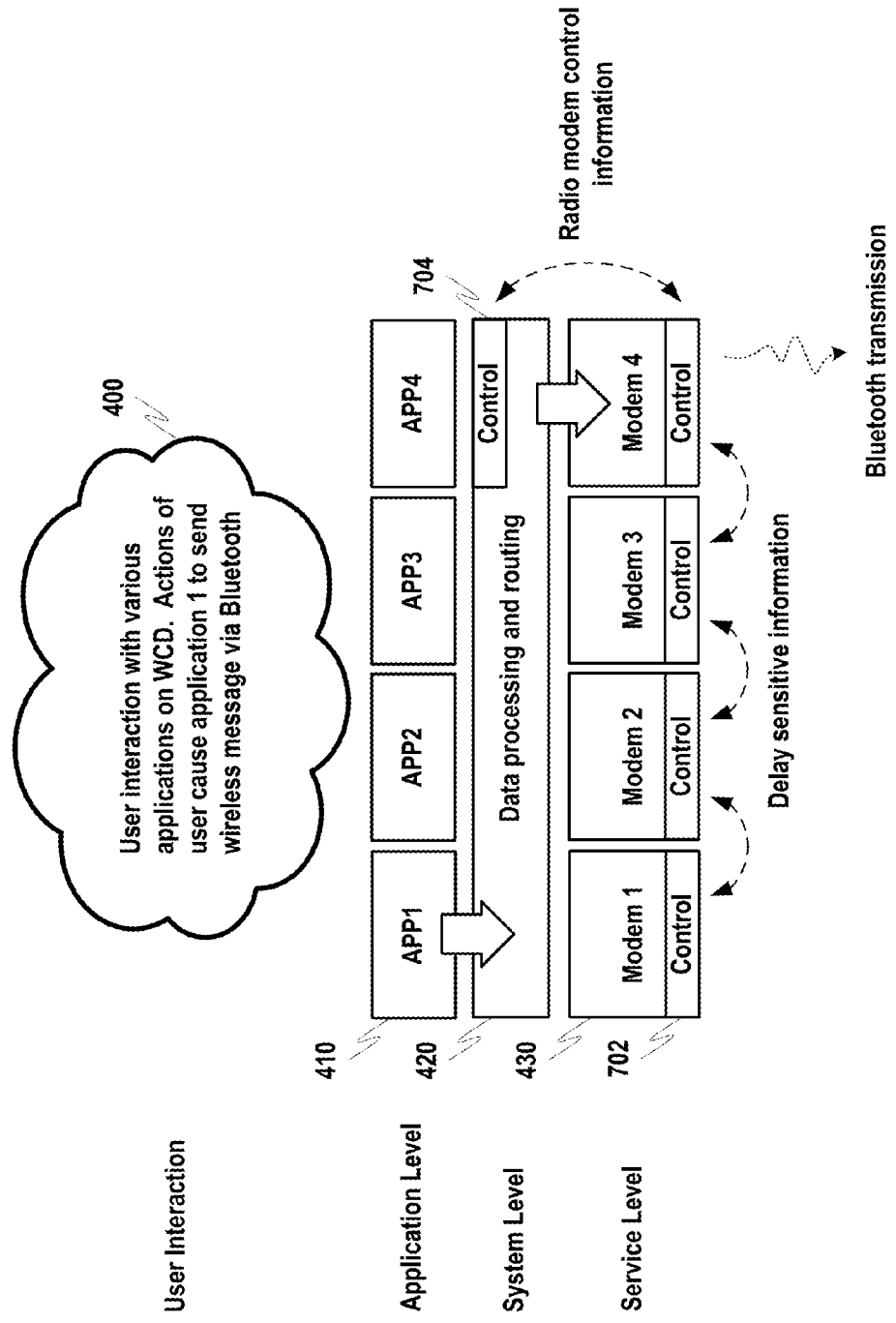
FIG. 9C discloses an Example operational description of a wireless communication device including a distributed multiradio control system in accordance with the alternative embodiment of the present invention disclosed in FIG. 9A.

FIG. 9C discloses the operational effect of the enhancements seen in the current alternative embodiment of the present invention on communication in WCD 100. The addition of an alternative route for radio modem control information to flow between distributed control components 702 and 704 may both improve the communication management of radio activity controllers 720 and lessen the burden on master control system 640. In the disclosed example embodiment, all distributed control components of MCS 700 are linked by a dedicated control interface, which provides immunity to communication coordination control messaging in WCD 100 when the master control system 640 is experiencing elevated transactional demands.

Figure 10:
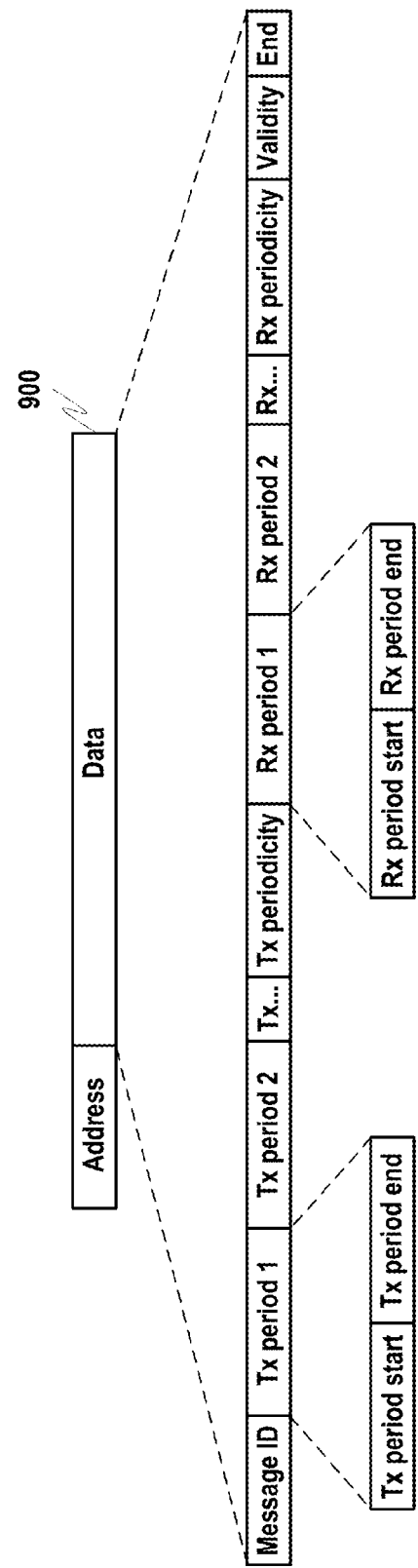
FIG. 10 discloses an Example information packet usable with at least one embodiment of the present invention.

In accordance with at least one example embodiment of the present invention, an example message packet 900 is disclosed in FIG. 10. Example message packet 900 may include activity pattern information that may be formulated by MRC 600 or radio activity controller 720. The data payload of packet 900 may include, in accordance with various example embodiments of the present invention, at least Message ID information, allowed/disallowed transmission (Tx) period information, allowed/disallowed reception (Rx) period information, Tx/Rx periodicity (how often the Tx/Rx activities contained in the period information occur), and validity information describing when the activity pattern becomes valid and whether the new activity pattern is replacing or added to the existing one. The data payload of packet 900, as shown, may consist of multiple allowed/disallowed periods for transmission or reception (e.g., Tx period 1, 2 . . . ) each containing at least a period start time and a period end time during which radio modem 610 may either be permitted or prevented from executing a communication activity. While the distributed example of MCS 700 may allow radio modem control activity to be controlled in real-time (e.g., more control messages with finer granularity), the ability to include multiple allowed/disallowed periods into message packet 900 may support radio activity controllers 720 in scheduling radio modem behavior for longer periods of time, and thus, may reduce message traffic. Further, changes in radio modem 610 activity patterns may be amended using the validity information in each message packet 900.

The modem activity control signal (e.g., packet 900) may be formulated by MRC 600 or radio activity controller 720 and transmitted on MCS 700. The signal includes activity periods for Tx and Rx separately, and the periodicity of the activity for the radio modem 610. While the native radio modem clock is the controlling time domain (never overwritten), the time reference utilized in synchronizing the activity periods to current radio modem operation may be based on one of at least two standards. In a first example, a transmission period may start after a pre-defined amount of synchronization events have occurred in radio modem 610. Alternatively, all timing for MRC 600 or between distributed control components 702 may be standardized around the system clock for WCD 100. Advantages and disadvantages exist for both solutions. Using a defined number of modem synchronization events is beneficial because then all timing is closely aligned with the radio modem clock. However, this strategy may be more complicated to implement than basing timing on the system clock. On the other hand, while timing based on the system clock may be easier to implement as a standard, conversion to modem clock timing must necessarily be implemented whenever a new activity pattern is installed in radio modem 610.

The activity period may be indicated as start and stop times. If there is only one active connection, or if there is no need to schedule the active connections, the modem activity control signal may be set always on allowing the radio modems to operate without restriction. Radio modem 610 may check whether the transmission or reception is allowed before attempting actual communication. The activity end time can be used to check the synchronization. Once the radio modem 610 has ended the transaction (slot/packet/burst), it can check whether the activity signal is still set (it should be due to margins). If this is not the case, the radio modem 610 can reinitiate synchronization with MRC 600 or with radio activity controller 720 via synchronizer 730. The same corrective action may happen if a radio modem's time reference or connection mode changes. Problems may occur if radio activity controller 720 runs out of synchronization with the radio modem and starts to apply modem transmission/reception restrictions at the wrong time. To avoid this scenario, modem synchronization signals need to be updated periodically. An increasing number of active wireless connections may increase the requirement for a high degree of accuracy in synchronization information.

IX. Radio Modem Interface to Other Devices

As a part of information acquisition services, the MCS interface 710 may need to send information to MRC 600 (or radio activity controllers 720) about periodic events of the radio modems 610. Each radio modem 610 may use MCS interface 710 to indicate a time instance of a periodic event related to its operation. In practice these instances are times when radio modem 610 is active and may be preparing to communicate or is communicating. Events occurring prior to or during a transmission or reception mode may be used as a time reference (e.g., in case of GSM, the frame edge may be indicated in a modem that is not necessarily transmitting or receiving at that moment, but we know based on the frame clock that the modem is going to transmit [x]ms after the frame clock edge). Basic principle for such timing indications is that the event is periodic in nature. Every incident needs not to be indicated, but the MRC 600 may calculate intermediate incidents itself. In order for intermediate incidents to be calculated, the controller would also require other relevant information about the event, e.g. periodicity and duration. This information may be either embedded in the indication or the controller may get it by other means. Most importantly, these timing indications need to be such that the controller can acquire a radio modem's basic periodicity and timing. The timing of an event may either be in the indication itself, or it may be implicitly defined from the indication information by MRC 600 (or radio activity controller 720).

In general terms these timing indications need to be provided on periodic events like schedule broadcasts from a base station (typically TDMA/MAC frame boundaries) and their own periodic transmission or reception periods (typically Tx/Rx slots). Those notifications need to be issued by the radio modem 610: (1) on network entry (i.e. modem acquires network synchrony), (2) on periodic event timing change e.g. due to a handoff or handover and (3) as per the policy and configuration settings in the multiradio controller (monolithic or distributed).

In at least one example embodiment of the present invention, various messages exchanged between the aforementioned communication components in WCD 100 may be used to dictate behavior on both a local (radio modem level) and global (WCD level) basis. MRC 600 or radio activity controller 720 may deliver a schedule to radio modem 610 with the intent of controlling that specific modem. However, radio modem 610 may not be compelled to conform to this schedule. The basic principle is that radio modem 610 is not only operating according to multiradio control information (e.g., operates only when MRC 600 allows) but is also performing internal scheduling and link adaptation while taking MRC scheduling information into account.

X. Example of Integrating Apparatus Level Multiradio Control with Proprietary Local Control The various implementations of multiradio management that are described above start with a demand for communication from the application level. For example, some high-level activity from an application, user interaction, etc. results in a need to transmit and/or receive information from a remote resource. These requirements may become inputs into the multiradio control system that may, in turn, arrange a plurality of communication requirements pending in an apparatus into a relative order by priority. This priority order may establish a hierarchy of operation that places the execution of higher priority communication over other concurrent activity. This information may then be presented for transmission to the one or more radio modules that are tasked with the conveyance of this information to the remote resource.

Figure 11:
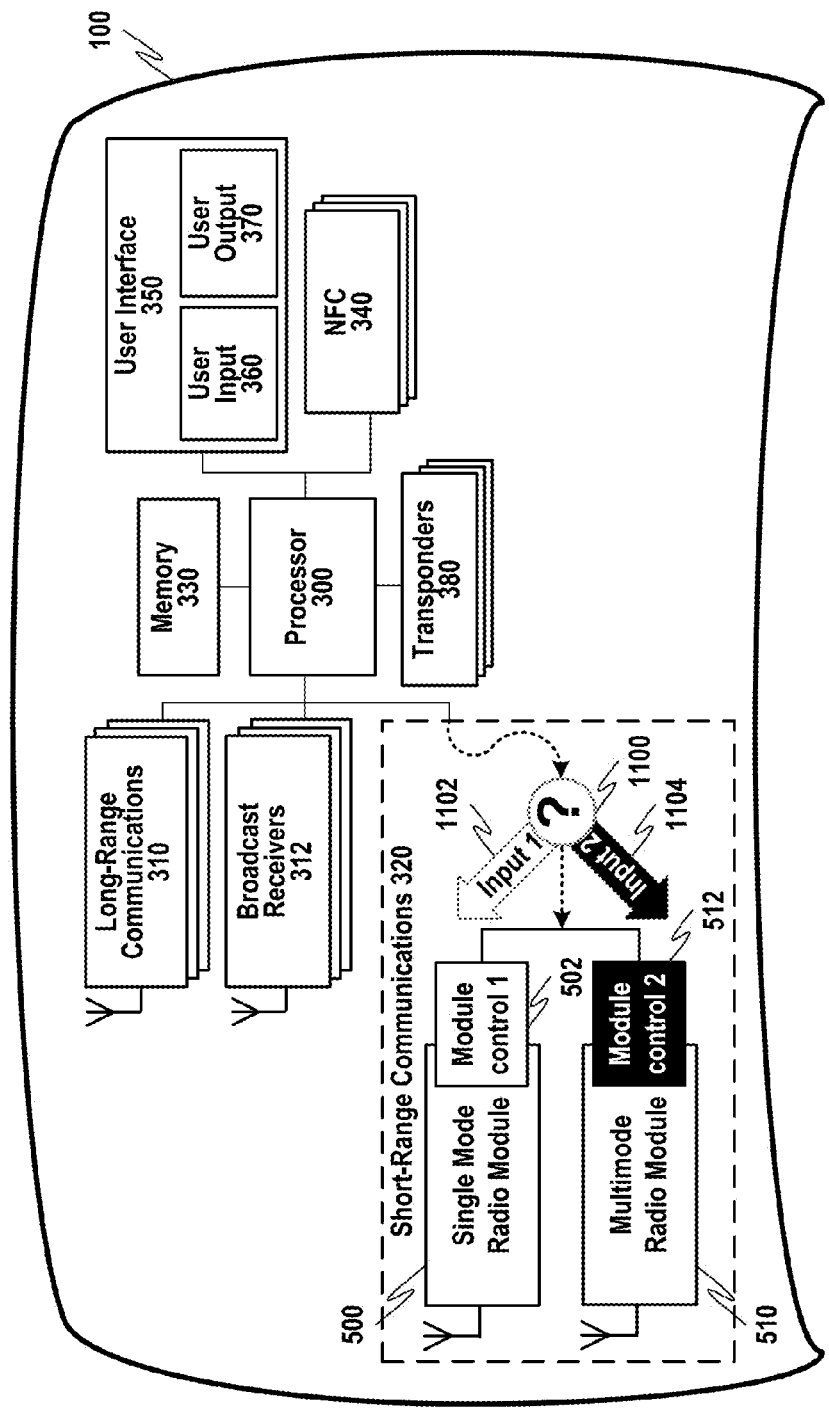
FIG. 11 discloses an example scenario wherein different radio modules are expecting different inputs in accordance with at least one embodiment of the present invention.

However, the processing of communication requirements by one or more radio modules that are tasked with fulfilling them may not be as simple as the passing of information. As previously discussed above, radio module operation may vary by implementation. FIG. 11 discloses an example implementation that may include two different radio modules. Short-range communications 320 may comprise one or more single mode radios 500 and one or more multimode radios 512. Each single mode radio 500 may comprise local control resources such as module control 1 (shown at 502), whereas each multimode radio may be likewise situated with local control (e.g., module control 2 as shown at 512). From the standpoint of control strategies, it would be reasonable to assume that radio modules that can only support one communication stream (or flow) at a time would have a different control logic or strategy than radio modules equipped to handle multiple streams. As a result, the inputs expected by each local control entity 502 and 512 may be entirely different. Message information that is being forwarded to the one or more radio modules for transmission, as show at 1100, must therefore be customized in consideration of the particular type of radio module, as shown at 1102 and 1104.

Moreover, this situation may be further complicated by the prospect that radio modules of the same type (e.g., single mode or multimode) may vary further based on the control strategy employed by the particular manufacturer. For instance, a multimode radio made by manufacturer "A" may employ a certain control strategy for locally maintaining concurrent wireless communication. However, manufacturer "B" may also offer multimode radio modules that are constructed using different materials and/or architecture, may support a different number or type (e.g., Bluetooth™ vs. WLAN) of concurrent communication flows, etc. It therefore becomes apparent that radio modules from manufacturer "A" and manufacturer "B", while both multimode-type radio modules, may expect totally different input information. Moreover, even if the radio modules could possibly accept the same input information, they may arrive at vastly different outcomes since there is no standard governing how the input information is processed.

Figure 12:
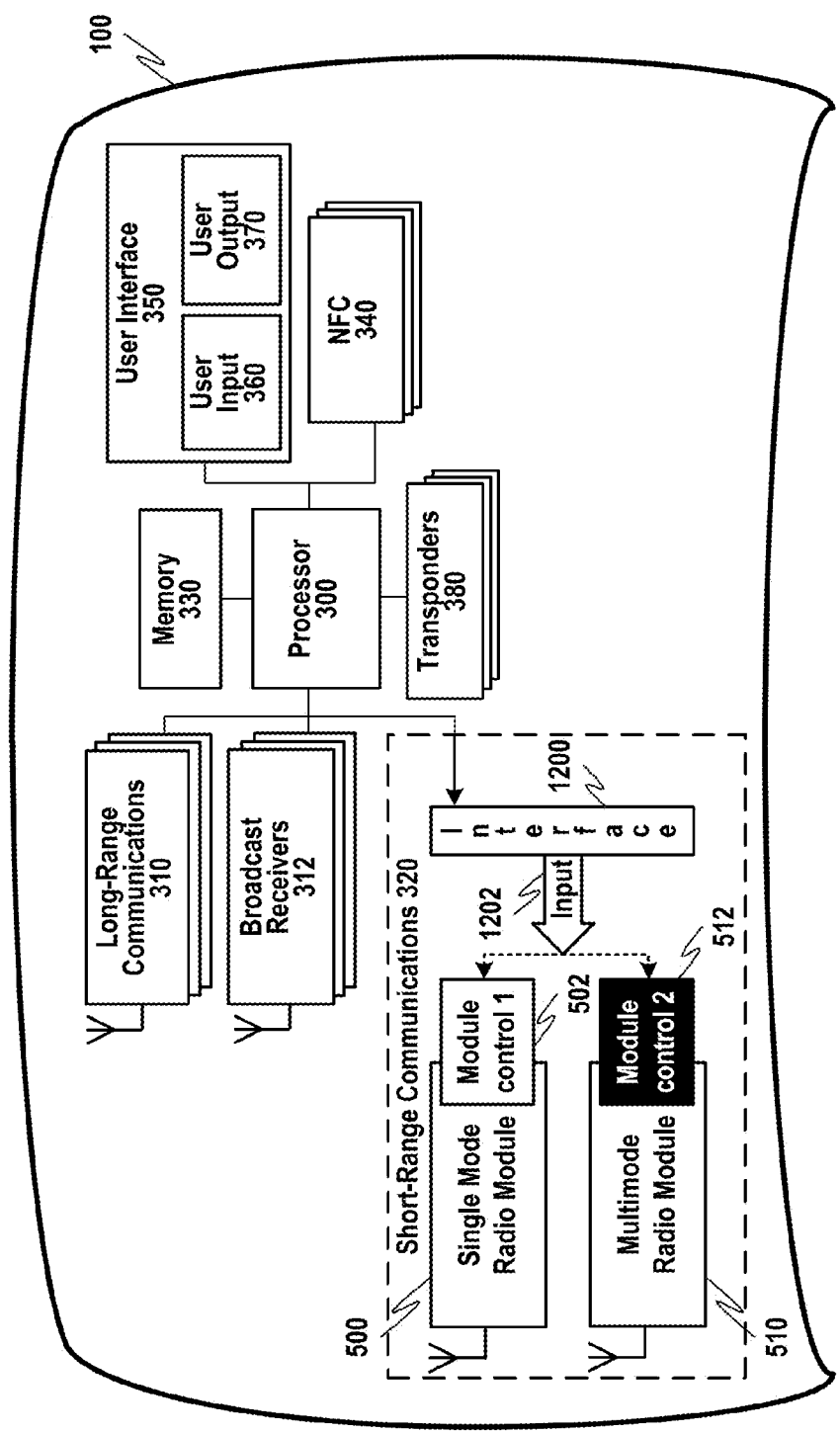
FIG. 12 discloses an example interface in accordance with at least one embodiment of the present invention.

One solution may be to disable or override the local control resources in certain apparatus configurations in order to allow the apparatus-level radio control to manage the various concurrent communication flows. However, this both dismisses the advantage of having local control at the radio level, which just prior to message transmission may have a more real-time perspective of the potential for interference, and offloads this burden onto control entities like MRC 600 that may become overwhelmed when there is a high level of activity in WCD 100. FIG. 12 proposes a solution that may leverage the benefits provided by local control. In FIG. 12 an interface 1200 is introduced into the system that provides the same input 1202 to all radio modules, regardless of type, manufacturer, etc. Instead of instructing the radio module exactly what flow should be processed at a certain time, input 1200 may comprise operational guidelines or threshold conditions that allow radio modules to manage operation locally within parameters established by control entities within the apparatus (e.g., multiradio control or interface 1200).

Interface 1200 may comprise various configurations of hardware and/or software. For example, interface 1200 may include one or more executable software programs or modules that may be loaded into memory 330 for execution by processor 300. The one or more software programs/modules may be part of a generalized apparatus communication control architecture, or alternatively, may be a standalone entity that is loaded only in apparatuses with a particular configuration. When implemented as a primarily software-based solution, interface 1200 may receive communication flow information from master control system 640 and/or MRC 600, and may further obtain communication flow performance information directly from the one or more radio modules. Alternatively, interface 1200 may comprise both hardware and software in the form of an integrated chip or chipset. Chip/chipsets may be hard-coded with executable program code for managing communication flow in accordance with various example embodiments of the present invention. This implementation may further include physical inputs, outputs, memory and/or processing resources for communication flow management. Hardware/software solutions may offer some advantages in that localized processing/execution may be more insulated, and thus more immune, to other activities occurring in the apparatus. Moreover, it may be easier to implement a chip or chipset where resources (e.g., power, space, processing, etc.) are limited.

FIG. 13 discloses an example of information that may be provided as part of input 1202 from interface 1200 to any type or configuration of radio module. The information that is actually included in input 1202 may comprise some or all of the parameters described in FIG. 13 depending, for example, on the particular local control features available in the receiving radio module, the limitations being imposed by apparatus-level multiradio control (if available), etc. Communication flows may initially be identified (e.g., a flow identifier) and associated with a priority (e.g., a flow priority) and bitrate variability settings (e.g., bitrate). Input 1202 may then establish target values and minimum values corresponding to bitrate, error rate and sample rate. Target values may set forth the desired performance parameters, while a lower threshold level for acceptable performance may be established by the minimum settings for these parameters.

Floating priority may be established in radio modules if a determination is made, either in interface 1200 or by another control entity, that the radio module may locally manage the relative priority of communication flows. Even if floating priority is permitted in the radio module, parameters related to performance levels at which the priority may be altered. Examples of these limiting parameters may comprise floating priority hysteresis, floating minimum and floating maximum as set forth in FIG. 13, which may be interpreted by local control in the radio module when determining whether the priority of a communication flow can be changed.

As further shown in FIG. 13, parameters for controlling flow measurement in a radio module may also be specified in input 1202. For example, a flow measurement window may be established on a flow by flow basis. The results of these measurements may be reported back in a specific manner (e.g., defined by the result message parameters). Depending on the particular features available in a radio module, it may also be possible to specify that alerts be reported back to the interface and/or to a multiradio control entity in the apparatus. As shown in FIG. 13, two examples of these alerts include hysteresis exceeded and minimum value breach.

XI. Examples Showing Possible Effects of Various Embodiments of the Present Invention FIGS. 14 and 15 demonstrate example effects of flow scheduling in accordance with various embodiments of the present invention. Example flows 1400 and 1410 represent communication activity occurring substantially concurrently. Each communication flow has specific control parameters set forth in FIG. 14 that define how the radio module may alter the relative priority of each communication flow. These parameters define that local control within the radio module may adjust the priority in accordance with a local communication flow control strategy. Communication flow 1400 in FIG. 14 starts with a high priority (3) and does not encounter interference. Therefore, the radio module may lower the relative priority until interference is encountered. Conversely, flow 1410 encounters interference from the start, and therefore raises the priority in accordance with the parameters in input 1202. Similar adjustments may continue to be made in flows 1400 and 1410 as interference is encountered.

Another example scenario is disclosed in FIG. 15 comprising flows 1500 and 1510. Again, the priority in flow 1500 may begin high but may drop as no interference is encountered. However, a total failure that occurs in the third target rate sample window triggers a reaction in the radio module. In order to maintain the minimum bitrate if 12 units/window, the local controller elevates the priority of the remaining target rate sample windows in the minimum rate sample window in order to ensure the minimum bitrate is maintained. This is permissible because communication flow 1510 has a low minimum bitrate requirement (4 units/minimum rate window) which is still achievable even though flow 1510 is prioritized behind flow 1500.

A flowchart of an example communication control process in accordance with at least one example embodiment of the present invention is disclosed in FIG. 16. Communication flow management, as depicted in FIG. 16, discusses the monitoring and control of only a single communication flow. However, as previously described with respect to various implementations of the present invention, the process of FIG. 16 may be applied to each active communication flow in a plurality of substantially concurrent communication flows that exist in an apparatus.

An incoming communication flow (e.g., from other resources in the apparatus) may be realized in step 1600, which may then be scheduled in step 1602. Scheduling may be performed in accordance with any of the various example embodiments of multiradio control that were described above. At the least, a priority may be determined between communication flows that are pending in the apparatus. A determination may then be made as to whether the priority of the communication flow may be changed locally (e.g., by control resources in the radio module in step 1604. Authorizing local control may depend on whether communication flows that are considered to be high priority by the user/apparatus are permitted to be demoted. Local reprioritization may be restricted in situations where a particular communication flow should always be regarded as highest priority. If floating priority is disabled, the process may move to step 1606 where a determination may be made regarding whether the communication flow is at least maintaining the minimum performance defined by the parameters in input 1202. If performance is not at or above the minimum defined for the communication flow, as specified by parameters in input 1202, an alert may be issued in step 1608 notifying interface 1200 and/or other radio control resources in the apparatus that the specified minimum for the communication flow has been breached. Regardless of whether the communication flow is operating at or above the minimum in step 1606, or alternatively, a breach alert has been issued in step 1608, the process may return to step 1600 to continue managing other active communication flows.

If floating priority (e.g., local control) is permitted for the communication flow in step 1604, then a further determination may occur in step 1610 as to whether the communication flow is performing at or above a specified target level. The target performance level may also be specified by parameters in input 1202. If communication flow performance is determined to be below target, then the relative priority of the communication flow may be increased in step 1612. The process may then resume at step 1600 with the management of other communication flows.

If the performance of the communication flow is determined to be at or above the specified target level in step 1610, then in step 1614 a further determination may be made as to whether the communication flow performance also exceeds a floating hysteresis level. The floating hysteresis level, which may also be defined by parameters in input 1202, establishes a level of performance above which the relative priority level of the communication flow may be changed (if necessary) by local control resources in the radio module. If communication flow performance exceeds the floating hysteresis level in step 1614, then in step 1616 an indication identifying that this performance level may be sent to interface 1200 and/or other radio control resources in the apparatus. The relative priority level of the communication flow may then be reduced in step 1618 in order to, for example, release scheduled bandwidth for reallocation to other communication flows that may need more channel access. The process may then return to step 1600 to manage other communication flows that may be actively occurring in the apparatus.

While various exemplary configurations of the present invention have been disclosed above, the present invention is not strictly limited to the previous embodiments.

For example, the present invention may include, in accordance with at least one example embodiment, a method comprising receiving communication requirements comprising two or more communication flows at an interface, determining operational conditions comprising at least a relative priority for the two or more communication flows in the interface, and providing configuration information based on the operational conditions from the interface to one or more radio modules.

The prior example of a method, in accordance with at least one embodiment of the present invention, may further comprise configuration information that specifies a minimum quality of service and a target quality of service based on the operational conditions.

The prior example of a method, in accordance with at least one embodiment of the present invention, may further comprise configuration information that indicates whether the relative priority can be changed locally by the one or more radio modules. In addition, this example method may include the configuration information comprising one or more parameters that define how the one or more radio modules can change the relative priority.

The prior example of a method, in accordance with at least one embodiment of the present invention, may further comprise configuration information that indicates at least one level of performance at which an alert is triggered.

For example, the present invention may include, in accordance with at least one example embodiment, a computer program product comprising computer executable program code recorded on a computer readable medium comprising computer program code configured to receive communication requirements comprising two or more communication flows at an interface, computer program code configured to determine operational conditions comprising at least a relative priority for the two or more communication flows in the interface, and computer program code configured to provide configuration information based on the operational conditions from the interface to one or more radio modules.

The prior example of a computer program product, in accordance with at least one embodiment of the present invention, may further comprise configuration information that specifies a minimum quality of service and a target quality of service based on the operational conditions.

The prior example of a computer program product, in accordance with at least one embodiment of the present invention, may further comprise configuration information that indicates whether the relative priority can be changed locally by the one or more radio modules. In addition, this example computer program product may include configuration information comprising one or more parameters that define how the one or more radio modules can change the relative priority.

The prior example of a computer program product, in accordance with at least one embodiment of the present invention, may further comprise configuration information that indicates at least one level of performance at which an alert is triggered.

For example, the present invention may include, in accordance with at least one example embodiment, an apparatus comprising a processor, the processor being configured to: receive communication requirements comprising two or more communication flows at an interface, determine operational conditions comprising at least a relative priority for the two or more communication flows in the interface, and provide configuration information based on the operational conditions from the interface to one or more radio modules.

The prior example of an apparatus, in accordance with at least one embodiment of the present invention, may further comprise configuration information that specifies a minimum quality of service and a target quality of service based on the operational conditions.

The prior example of an apparatus, in accordance with at least one embodiment of the present invention, may further comprise configuration information that indicates whether the relative priority can be changed locally by the one or more radio modules. In addition, this example apparatus may include configuration information comprising one or more parameters that define how the one or more radio modules can change the relative priority.

The prior example of an apparatus, in accordance with at least one embodiment of the present invention, may further comprise configuration information that indicates at least one level of performance at which an alert is triggered.

For example, the present invention may include, in accordance with at least one example embodiment an apparatus comprising means for receiving communication requirements comprising two or more communication flows at an interface, means for determining operational conditions comprising at least a relative priority for the two or more communication flows in the interface, and means for providing configuration information based on the operational conditions from the interface to one or more radio modules.

For example, the present invention may include, in accordance with at least one example embodiment a chipset, comprising control resources, the control resources being configured to receive communication requirements comprising two or more communication flows into an interface, determine operational conditions comprising at least a relative priority for the two or more communication flows in the interface, and provide configuration information based on the operational conditions from the interface to one or more radio modules.

For example, the present invention may include, in accordance with at least one example embodiment, a system comprising an apparatus, wherein the apparatus comprises at least multiradio controller, an interface and one or more radio modules, the interface receiving communication requirements comprising two or more communication flows from the multiradio controller and determining operational conditions comprising at least a relative priority for the two or more communication flows in the interface, and the interface further providing configuration information based on the operational conditions from the interface to the one or more radio modules.

Accordingly, it will be apparent to persons skilled in the relevant art that various changes in forma and detail can be made therein without departing from the spirit and scope of various example embodiments of the present invention. The breadth and scope of the present invention should not be limited by any of the above-described example embodiments, but should be defined only in accordance with the following claims and their equivalents.

What is claimed:

1. A method, comprising:
   receiving, at one or more radio modules in an apparatus, communication requirements comprising two or more communication flows via an interface within the apparatus, the interface providing indications that allow the one or more radio modules in the apparatus, to manage operation locally;
   determining operational conditions at the one or more radio modules in the apparatus based at least in part upon the received communication requirements, the operational conditions comprising at least a local priority level of the one or more radio modules for the two or more communication flows in the interface; and
   scheduling communication in the one or more radio modules within the apparatus to conform with the operational conditions based on the indications indicating whether the local priority level can be changed locally by the one or more radio modules.

2. The method of claim 1, wherein the indications indicates a minimum quality of service and a target quality of service based on the operational conditions.

3. The method of claim 1, wherein the indications comprises parameters that define how the one or more radio modules can locally change the local priority level.

4. The method of claim 1, wherein the indications indicates at least one level of performance at which an alert is triggered.

5. A computer program product comprising computer executable program code recorded on a computer readable non-transitory storage medium, the computer executable program code comprising:
- code configured to cause an apparatus to receive at one or more radio modules in an apparatus, communication requirements comprising two or more communication flows via an interface within the apparatus, the interface providing indications that allow the one or more radio modules in the apparatus, to manage operation locally;
- code configured to cause an apparatus to determine operational conditions at the one or more radio modules in the apparatus based at least in part upon the received communication requirements, the operational conditions comprising at least a local priority level of the one or more radio modules for the two or more communication flows in the interface; and
- code configured to cause an apparatus to schedule communication in the one or more radio modules within the apparatus to conform with the operational conditions based on the indications indicating whether the local priority level can be changed locally by the one or more radio modules.

6. The computer program product of claim 5, wherein the indications indicates a minimum quality of service and a target quality of service based on the operational conditions.

7. The computer program product of claim 5, wherein the indications comprises parameters that define how the one or more radio modules can locally change the local priority level.

8. The computer program product of claim 5, wherein the indications indicates at least one level of performance at which an alert is triggered.

9. An apparatus, comprising:
- at least one processor; and
- at least one memory including executable instructions, the at least one memory and the executable instructions being configured to, in cooperation with the at least one processor, cause the device to perform at least the following:
- receive at one or more radio modules in the apparatus, communication requirements comprising two or more communication flows via an interface within the apparatus, the interface providing indications that allow the one or more radio modules in the apparatus, to manage operation locally;
- determine operational conditions at the one or more radio modules in the apparatus based at least in part upon the received communication requirements, the operational conditions comprising at least a local priority level of the one or more radio modules for the two or more communication flows in the interface; and
- schedule communication in the one or more radio modules within the apparatus to conform with the operational conditions based on the indications indicating whether the local priority level can be changed locally by the one or more radio modules.

10. The apparatus of claim 9, wherein the indications indicates a minimum quality of service and a target quality of service based on the operational conditions.

11. The apparatus of claim 9, wherein the indications comprises parameters that define how the one or more radio modules can locally change the local priority level.

12. The apparatus of claim 9, wherein the indications indicates at least one level of performance at which an alert is triggered.

13. An apparatus, comprising:
- means for receiving, at one or more radio modules in an apparatus, communication requirements comprising two or more communication flows via an interface within the apparatus, the interface providing indications that allow the one or more radio modules in the apparatus, to manage operation locally;
- means for determining operational conditions at the one or more radio modules in the apparatus based at least in part upon the received communication requirements, the operational conditions comprising at least a local priority level of the one or more radio modules for the two or more communication flows in the interface; and
- means for scheduling communication in the one or more radio modules within the apparatus to conform with the operational conditions based on the indications indicating whether the local priority level can be changed locally by the one or more radio modules.

14. A chipset, comprising:
a controller configured to:
- receive at one or more radio modules in an apparatus, communication requirements comprising two or more communication flows via an interface within the apparatus, the interface providing indications that allow the one or more radio modules in the apparatus, to manage operation locally;
- determine operational conditions at the one or more radio modules in the apparatus based at least in part upon the received communication requirements, the operational conditions comprising at least a local priority level of the one or more radio modules for the two or more communication flows in the interface; and
- schedule communication in the one or more radio modules within the apparatus to conform with the operational conditions based on the indications indicating whether the local priority level can be changed locally by the one or more radio modules.

15. A system, comprising:
- an apparatus, wherein the apparatus includes a multiradio controller, an interface and one or more radio modules, the interface providing indications that allow the one or more radio modules in the apparatus, to manage operation locally;
- the interface receiving communication requirements comprising two or more communication flows from the multiradio controller and determining operational conditions at the one or more radio modules in the apparatus based at least in part upon the received communication requirements, the operational conditions comprising at least a local priority level of the one or more radio modules for the two or more communication flows in the interface; and
- the one or more radio modules scheduling communication to conform with the operational conditions based on the indications indicating whether the local priority level can be changed locally by the one or more radio modules.

* * * * *